(12) United States Patent
Manolakos et al.

(10) Patent No.: US 11,722,181 B2
(45) Date of Patent: Aug. 8, 2023

(54) DEFAULT QUASI CO-LOCATION ASSUMPTION FOR CROSS CARRIER REFERENCE SIGNAL TRIGGERING

(71) Applicant: QUALCOMM Incorporated, San Diego, CA (US)

(72) Inventors: Alexandros Manolakos, San Diego, CA (US); Yan Zhou, San Diego, CA (US); Parisa Cheraghi, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 404 days.

(21) Appl. No.: 16/913,777

(22) Filed: Jun. 26, 2020

(65) Prior Publication Data

US 2021/0067205 A1 Mar. 4, 2021

(30) Foreign Application Priority Data

Aug. 27, 2019 (GR) ............................... 20190100372

(51) Int. Cl.
*H04B 7/024* (2017.01)
*H04B 7/06* (2006.01)
(Continued)

(52) U.S. Cl.
CPC ........... *H04B 7/024* (2013.01); *H04B 7/0626* (2013.01); *H04L 5/0051* (2013.01);
(Continued)

(58) Field of Classification Search
None
See application file for complete search history.

(56) References Cited

U.S. PATENT DOCUMENTS

2018/0115357 A1\* 4/2018 Park ...................... H04L 5/0051
2019/0069285 A1\* 2/2019 Chandrasekhar .... H04B 7/0695
(Continued)

FOREIGN PATENT DOCUMENTS

WO WO-2019099659 A1 5/2019

OTHER PUBLICATIONS

Ericsson: "Motivation for Correction to Aperiodic CSI-RS Triggering with Different Numerology Between PDCCH and CSI-RS", 3GPP Draft, 3GPP TSG RAN Meeting #83, RP-190631, vol. TSG RAN, No. Shenzhen, China, Mar. 18, 2019-Mar. 21, 2019, Mar. 17, 2019 (Mar. 17, 2019), XP051690636, 10 Pages, Retrieved from the Internet: URL: http://www.3gpp.org/ftp/tsg%5Fran/TSG%5FRAN/TSGR%5F83/Docs/RP%2D190631%2Ezip [retrieved on Mar. 17, 2019] pp. 1-11.
(Continued)

*Primary Examiner* — Edan Orgad
*Assistant Examiner* — Emmanuel K Maglo
(74) *Attorney, Agent, or Firm* — Holland & Hart LLP

(57) ABSTRACT

Methods, systems, and devices for wireless communications are described. A user equipment (UE) may receive, via a first component carrier, control information that triggers transmission of an aperiodic reference signal in a second component carrier. The UE may identify a quasi co-location (QCL) assumption for reception of the aperiodic reference signal in the second component carrier based at least in part on a control resource set not being configured for the second component carrier. The UE may then monitor for the aperiodic reference signal of the second component carrier based on the QCL assumption. In some cases, the UE may transmit a measurement report to a base station based on a measurement of the reference signal.

30 Claims, 19 Drawing Sheets

(51) Int. Cl.
  *H04L 5/00* (2006.01)
  *H04W 56/00* (2009.01)
  *H04W 80/02* (2009.01)
  *H04W 72/23* (2023.01)

(52) U.S. Cl.
  CPC ......... *H04W 56/001* (2013.01); *H04W 72/23* (2023.01); *H04W 80/02* (2013.01); *H04L 5/001* (2013.01)

(56) References Cited

U.S. PATENT DOCUMENTS

| | | | | |
|---|---|---|---|---|
| 2019/0116594 | A1* | 4/2019 | Kwak | H04L 5/0096 |
| 2019/0356444 | A1* | 11/2019 | Noh | H04L 5/0023 |
| 2020/0067583 | A1* | 2/2020 | Shin | H04B 7/0417 |
| 2020/0295903 | A1* | 9/2020 | Faxér | H04W 72/23 |
| 2020/0350967 | A1* | 11/2020 | Xu | H04B 7/022 |
| 2020/0374967 | A1* | 11/2020 | Nogami | H04W 80/08 |
| 2020/0404690 | A1* | 12/2020 | Lee | H04W 72/1273 |
| 2022/0039099 | A1* | 2/2022 | Faxér | H04W 72/542 |

OTHER PUBLICATIONS

International Search Report and Written Opinion—PCT/US2020/042803—ISA/EPO—dated Oct. 19, 2020.

Qualcomm Incorporated: "Maintenance for Carrier Aggregation and Bandwidth Parts", 3GPP Draft, R1-1809429, 3GPP TSG RAN WG1 Meeting #94, Maintenance for CA BWP, 3rd Generation Partnership Project (3GPP), Mobile Competence Centre, 650, Route Des Lucioles, F-06921 Sophia-Antipolis Cedex, France, vol. RAN WG1, No. Gothenburg, Sweden; Aug. 20, 2018-Aug. 24, 2018, Aug. 11, 2018, XP051516792, 18 Pages, Retrieved from the Internet: URL: http://www.3gpp.org/ftp/tsg%5Fran/WG1%5FRL1/TSGR1%5F94/Docs/R1%2D1809429%2Ezip [retrieved on Aug. 11, 2018] p. 11, Sect.s 2.1.4, 3.2, lines 27-30 p. 15, lines 9-20, Sections 1-4.

Sony: "Remaining Issues on Downlink Beam Management", 3GPP Draft; R1-1804593, 3GPP TSG-RAN WG1 #92bis, 3rd Generation Partnership Project (3GPP), Mobile Competence Centre ; 650, Route Des Lucioles ; F-06921 Sophia-Antipolis Cedex ; France, vol. RAN WG1, No. Sanya, China; Apr. 16, 2018-Apr. 20, 2018, Apr. 15, 2018 (Apr. 15, 2018), XP051426862, 5 Pages, Retrieved from the Internet: URL: http://www.3gpp.org/ftp/Meetings%5F3GPP%5FSYNC/RAN1/Docs/ [retrieved on Apr. 15, 2018], Sections 1-3.

* cited by examiner

DEFAULT QUASI CO-LOCATION ASSUMPTION FOR CROSS CARRIER REFERENCE SIGNAL TRIGGERING

CROSS REFERENCE

The present Application for Patent claims the benefit of Greece Provisional Patent Application No. 20190100372 by MANOLAKOS et al., entitled "DEFAULT QUASI CO-LOCATION ASSUMPTION FOR CROSS CARRIER REFERENCE SIGNAL," filed Aug. 27, 2019, assigned to the assignee hereof, and expressly incorporated by reference herein.

BACKGROUND

The following relates generally to wireless communications, and more specifically to default quasi co-location assumption for cross carrier reference signal triggering.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

A UE may be configured with select a beam configuration to receive a reference signal based on a quasi co-location (QCL) assumption associated with another signal. Some techniques for identifying the QCL assumption can be improved.

SUMMARY

The described techniques relate to improved methods, systems, devices, and apparatuses that support aperiodic cross-carrier reference signal measurement. A user equipment (UE) may be configured with multiple component carriers, such as in a carrier aggregation configuration. A serving base station may transmit downlink control information (DCI) on a first component carrier which triggers the transmission of an aperiodic reference signal on the second component carrier. In an example, the DCI may trigger the UE to measure a channel state information (CSI) reference signal (CSI-RS) on the second component carrier. The first component carrier and the second component carrier may have different numerologies. In some cases, the first component carrier may have a lower subcarrier spacing (SCS) than the second component carrier, or the first and second carriers may be in different frequency ranges. The difference in numerologies may affect an offset between the DCI and the aperiodic reference signal. For example, the wireless communications system may support an offset between the triggering DCI and the aperiodic reference signal such that the aperiodic reference signal is not transmitted in a slot which overlaps a slot with the triggering DCI.

Once the UE detects the trigger to measure the aperiodic reference signal, the UE may determine a quasi co-location (QCL) association to use to receive the aperiodic reference signal. In some cases, the UE may be indicated a transmit configuration indicator (TCI) state for the aperiodic reference signal resource in the DCI. If there is a large enough gap between the triggering control channel and the resources for the aperiodic reference signal, the UE may be expected to apply the indicated QCL assumption. If the offset between the triggering DCI and the aperiodic reference signal is too short, the UE may instead use a default QCL assumption to receive the aperiodic reference signal. Techniques described herein support a UE to identify a default QCL assumption for receiving an aperiodic cross-carrier reference signal when the UE does not have a control resource set (CORESET) configured on component carrier with the aperiodic reference signal. Techniques are described for the UE to identify a default QCL assumption when the UE has one or more configured TCI states for the second component carrier, and techniques are described for the UE to identify a default QCL assumption when the UE does not have any configured TCI states on the second component carrier.

A method of wireless communications by a UE is described. The method may include receiving, via a first component carrier, control information that triggers transmission of an aperiodic reference signal in a second component carrier, identifying a quasi co-location assumption for reception of the aperiodic reference signal in the second component carrier based on a control resource set not being configured for the second component carrier, and receiving the aperiodic reference signal of the second component carrier based on the quasi co-location assumption.

An apparatus for wireless communications by a UE is described. The apparatus may include a processor, memory coupled with the processor, and instructions stored in the memory. The instructions may be executable by the processor to cause the apparatus to receive, via a first component carrier, control information that triggers transmission of an aperiodic reference signal in a second component carrier, identify a quasi co-location assumption for reception of the aperiodic reference signal in the second component carrier based on a control resource set not being configured for the second component carrier, and receive the aperiodic reference signal of the second component carrier based on the quasi co-location assumption.

Another apparatus for wireless communications by a UE is described. The apparatus may include means for receiving, via a first component carrier, control information that triggers transmission of an aperiodic reference signal in a second component carrier, identifying a quasi co-location assumption for reception of the aperiodic reference signal in the second component carrier based on a control resource set not being configured for the second component carrier, and receiving the aperiodic reference signal of the second component carrier based on the quasi co-location assumption.

A non-transitory computer-readable medium storing code for wireless communications by a UE is described. The code may include instructions executable by a processor to receive, via a first component carrier, control information that triggers transmission of an aperiodic reference signal in a second component carrier, identify a quasi co-location assumption for reception of the aperiodic reference signal in the second component carrier based on a control resource set not being configured for the second component carrier, and receive the aperiodic reference signal of the second component carrier based on the quasi co-location assumption.

Some examples of the method, apparatuses, and non-transitory computer-readable medium described herein may further include operations, features, means, or instructions for receiving control signaling that indicates a set of configured transmission configuration indicator states for a shared data channel of the second component carrier, where the identified quasi co-location assumption may be the same as a quasi co-location assumption corresponding to a first transmission configuration indicator state of the set of configured transmission configuration indicator states.

Some examples of the method, apparatuses, and non-transitory computer-readable medium described herein may further include operations, features, means, or instructions for receiving a control message that indicates that the first transmission configuration indicator state may be an activated transmission configuration indicator state with a lowest identifier of a set of identifiers corresponding to the one or more configured transmission configuration indicator states.

In some examples of the method, apparatuses, and non-transitory computer-readable medium described herein, receiving the control message may include operations, features, means, or instructions for receiving the control message that may be a medium access control (MAC) control element (CE).

In some examples of the method, apparatuses, and non-transitory computer-readable medium described herein, receiving the control signaling may include operations, features, means, or instructions for receiving the control signaling that may be radio resource control signaling that indicates the set of configured transmission configuration indicator states.

Some examples of the method, apparatuses, and non-transitory computer-readable medium described herein may further include operations, features, means, or instructions for receiving control signaling that indicates a set of configured transmission configuration indicator states for the second component carrier, where the identified quasi co-location assumption may be the same as a quasi co-location assumption corresponding to a first transmission configuration indicator state of the set of configured transmission configuration indicator states.

In some examples of the method, apparatuses, and non-transitory computer-readable medium described herein, the first transmission configuration indicator state that may have a lowest identifier in a set of identifiers that respectively correspond to the set of configured transmission configuration indicator states.

In some examples of the method, apparatuses, and non-transitory computer-readable medium described herein, the first transmission configuration indicator state may be a latest activated transmission configuration indicator state of the set of configured transmission configuration indicator states.

Some examples of the method, apparatuses, and non-transitory computer-readable medium described herein may further include operations, features, means, or instructions for performing a random access procedure on the second component carrier after detecting a synchronization signal block in the second component carrier, where the identified quasi co-location assumption may be the same as a quasi co-location assumption for the synchronization signal block.

In some examples of the method, apparatuses, and non-transitory computer-readable medium described herein, receiving the control information may include operations, features, means, or instructions for receiving, via the first component carrier having a first numerology, the control information that triggers transmission of the aperiodic reference signal in the second component carrier that may have a second numerology that differs from the first numerology.

In some examples of the method, apparatuses, and non-transitory computer-readable medium described herein, receiving the control information may include operations, features, means, or instructions for receiving, via the first component carrier that may be a frequency range 1 (FR1) component carrier that may have a first numerology, the control information that triggers transmission of the aperiodic reference signal in the second component carrier that may have a second numerology that differs from the first numerology.

In some examples of the method, apparatuses, and non-transitory computer-readable medium described herein, receiving the control information may include operations, features, means, or instructions for receiving, via the first component carrier that may be a frequency range 2 (FR2) component carrier, or a frequency range 3 (FR3) component carrier, or a frequency range 4 (FR4) component carrier, the control information that triggers transmission of the aperiodic reference signal in the second component carrier that may be a frequency range 2 (FR2) component carrier, or a FR3 component carrier, or a FR4 component carrier.

In some examples of the method, apparatuses, and non-transitory computer-readable medium described herein, receiving the control information may include operations, features, means, or instructions for receiving, via the first component carrier, the control information that triggers transmission of the aperiodic reference signal in the second component carrier that may be an FR2 component carrier, or an FR3 component carrier, or an FR4 component carrier.

In some examples of the method, apparatuses, and non-transitory computer-readable medium described herein, receiving the control information may include operations, features, means, or instructions for receiving, via the first component carrier, the control information that may be downlink control information that triggers transmission of the aperiodic reference signal in the second component carrier.

Some examples of the method, apparatuses, and non-transitory computer-readable medium described herein may further include operations, features, means, or instructions for transmitting a measurement report that indicates the reference signal measurement.

Some examples of the method, apparatuses, and non-transitory computer-readable medium described herein may further include operations, features, means, or instructions for deriving a channel metric that includes one or more of delay spread, doppler spread, average delay, doppler shift, or any combination thereof, based on the reference signal measurement, and decoding a shared data channel that uses the aperiodic reference signal as a quasi co-location source.

A method of wireless communications by a base station is described. The method may include transmitting, via a first component carrier, control information that triggers transmission of a aperiodic reference signal in a second component carrier, identifying a quasi co-location assumption for transmission of the aperiodic reference signal in the second component carrier based on a control resource set not being configured for the UE for the second component carrier, and transmitting an aperiodic reference signal via the second component carrier based on the quasi co-location assumption.

An apparatus for wireless communications by a base station is described. The apparatus may include a processor, memory coupled with the processor, and instructions stored in the memory. The instructions may be executable by the processor to cause the apparatus to transmit, via a first component carrier, control information that triggers transmission of a aperiodic reference signal in a second component carrier, identify a quasi co-location assumption for transmission of the aperiodic reference signal in the second component carrier based on a control resource set not being configured for the UE for the second component carrier, and transmit an aperiodic reference signal via the second component carrier based on the quasi co-location assumption.

Another apparatus for wireless communications by a base station is described. The apparatus may include means for transmitting, via a first component carrier, control information that triggers transmission of a aperiodic reference signal in a second component carrier, identifying a quasi co-location assumption for transmission of the aperiodic reference signal in the second component carrier based on a control resource set not being configured for the UE for the second component carrier, and transmitting an aperiodic reference signal via the second component carrier based on the quasi co-location assumption.

A non-transitory computer-readable medium storing code for wireless communications by a base station is described. The code may include instructions executable by a processor to transmit, via a first component carrier, control information that triggers transmission of a aperiodic reference signal in a second component carrier, identify a quasi co-location assumption for transmission of the aperiodic reference signal in the second component carrier based on a control resource set not being configured for the UE for the second component carrier, and transmit an aperiodic reference signal via the second component carrier based on the quasi co-location assumption.

Some examples of the method, apparatuses, and non-transitory computer-readable medium described herein may further include operations, features, means, or instructions for transmitting control signaling that indicates a set of configured transmission configuration indicator states for a shared data channel of the second component carrier, where the identified quasi co-location assumption may be the same as a quasi co-location assumption corresponding to a first transmission configuration indicator state of the set of configured transmission configuration indicator states.

Some examples of the method, apparatuses, and non-transitory computer-readable medium described herein may further include operations, features, means, or instructions for transmitting a control message that indicates that the first transmission configuration indicator state may be an activated transmission configuration indicator state with a lowest identifier of a set of identifiers corresponding to the one or more configured transmission configuration indicator states.

In some examples of the method, apparatuses, and non-transitory computer-readable medium described herein, transmitting the control message may include operations, features, means, or instructions for transmitting the control message that may be a MAC CE.

In some examples of the method, apparatuses, and non-transitory computer-readable medium described herein, transmitting the control signaling may include operations, features, means, or instructions for transmitting the control signaling that may be radio resource control signaling that indicates the set of configured transmission configuration indicator states.

Some examples of the method, apparatuses, and non-transitory computer-readable medium described herein may further include operations, features, means, or instructions for transmitting control signaling that indicates a set of configured transmission configuration indicator states for the second component carrier, where the identified quasi co-location assumption may be the same as a quasi co-location assumption corresponding to a first transmission configuration indicator state of the set of configured transmission configuration indicator states.

In some examples of the method, apparatuses, and non-transitory computer-readable medium described herein, the first transmission configuration indicator state that may have a lowest identifier in a set of identifiers that respectively correspond to the set of configured transmission configuration indicator states.

In some examples of the method, apparatuses, and non-transitory computer-readable medium described herein, the first transmission configuration indicator state may be a latest activated transmission configuration indicator state of the set of configured transmission configuration indicator states.

Some examples of the method, apparatuses, and non-transitory computer-readable medium described herein may further include operations, features, means, or instructions for performing a random access procedure on the second component carrier with the UE after detection of a synchronization signal block in the second component carrier, where the identified quasi co-location assumption may be the same as a quasi co-location assumption for the synchronization signal block.

In some examples of the method, apparatuses, and non-transitory computer-readable medium described herein, transmitting the control information may include operations, features, means, or instructions for transmitting, via the first component carrier having a first numerology, the control information that triggers transmission of the aperiodic reference signal in the second component carrier that may have a second numerology that differs from the first numerology.

In some examples of the method, apparatuses, and non-transitory computer-readable medium described herein, transmitting the control information may include operations, features, means, or instructions for transmitting, via the first component carrier that may be an FR1 component carrier that may have a first numerology, the control information that triggers transmission of the aperiodic reference signal in the second component carrier that may have a second numerology that differs from the first numerology.

In some examples of the method, apparatuses, and non-transitory computer-readable medium described herein, transmitting the control information may include operations, features, means, or instructions for transmitting, via the first component carrier that may be an FR2 component carrier, or an FR3 component carrier, or an FR4 component carrier, the control information that triggers transmission of the aperiodic reference signal in the second component carrier that may be a FR2 component carrier, or a FR3 component carrier, or a FR4 component carrier.

In some examples of the method, apparatuses, and non-transitory computer-readable medium described herein, transmitting the control information may include operations, features, means, or instructions for transmitting, via the first component carrier, the control information that triggers transmission of the aperiodic reference signal in the second component carrier that may be an FR2 component carrier, or an FR3 component carrier, or an FR4 component carrier.

In some examples of the method, apparatuses, and non-transitory computer-readable medium described herein, transmitting the control information may include operations, features, means, or instructions for transmitting, via the first component carrier, the control information that may be downlink control information that triggers transmission of the aperiodic reference signal in the second component carrier.

Some examples of the method, apparatuses, and non-transitory computer-readable medium described herein may further include operations, features, means, or instructions for receiving a measurement report that indicates the reference signal measurement.

DETAILED DESCRIPTION

Figure 1:
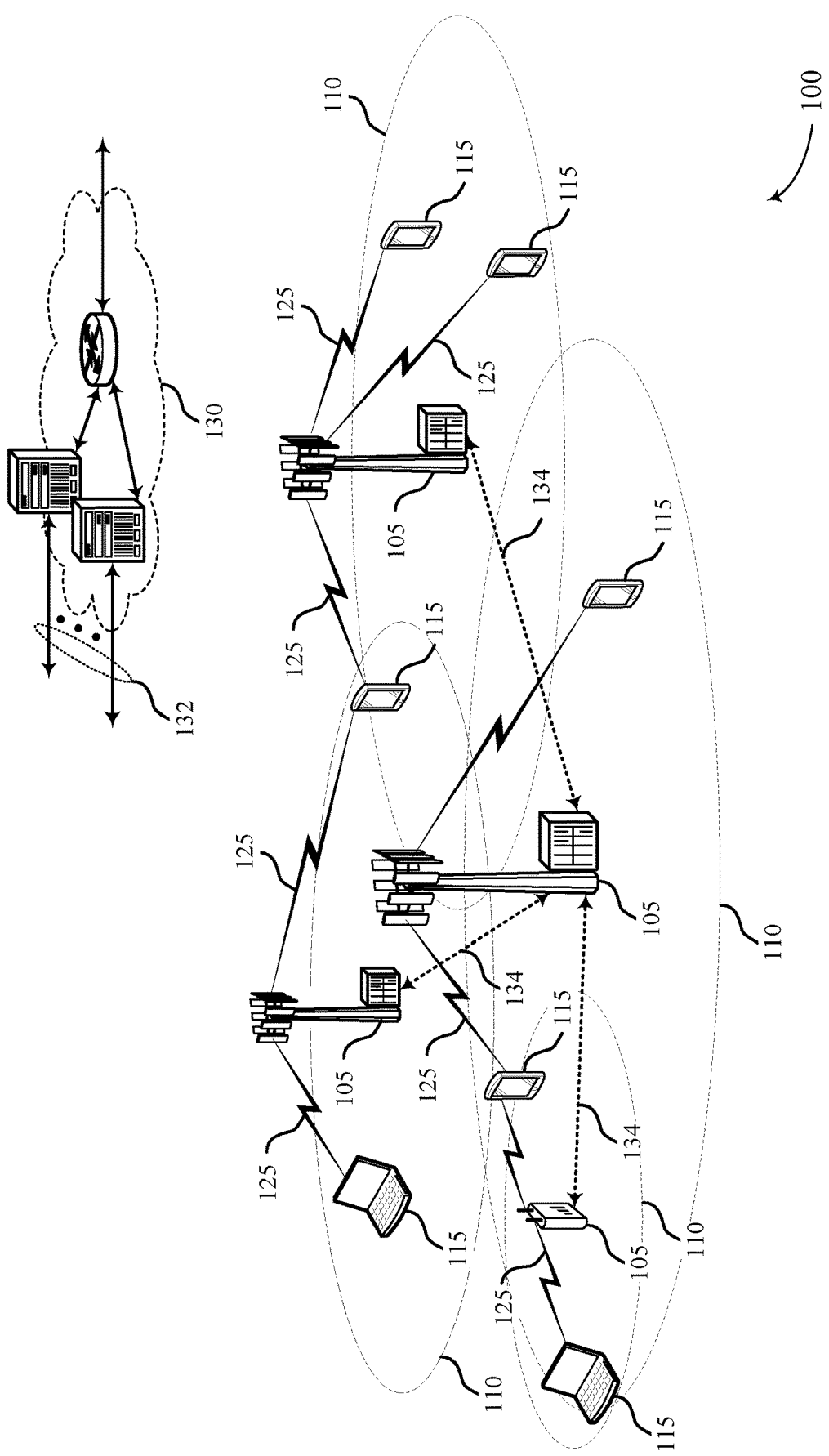
FIG. 1 illustrates an example of a system for wireless communications that supports default quasi co-location assumption for cross carrier reference signal triggering in accordance with aspects of the present disclosure.

Some wireless communications systems may support aperiodic cross-carrier reference signal measurements. A user equipment (UE) may be configured with multiple component carriers, such as in a carrier aggregation configuration. A serving base station may transmit downlink control information (DCI) on a first component carrier which triggers the transmission of an aperiodic reference signal on the second component carrier. In an example, the DCI may trigger the UE to measure a channel state information (CSI) reference signal (CSI-RS) on the second component carrier. Therefore, the aperiodic reference signal is triggered on the first component carrier, but the UE measures the aperiodic reference signal on the second component carrier. In some cases, the DCI may schedule an uplink shared channel on the first component carrier, and the UE may transmit a measurement report on the uplink shared channel.

The first component carrier and the second component carrier may have different numerologies. In some cases, the first component carrier may have a lower subcarrier spacing (SCS) than the second component carrier, or the first and second carriers may be in different frequency ranges. The difference in numerologies may affect an offset between the DCI and the aperiodic reference signal. For example, the wireless communications system may support an offset between the triggering DCI and the aperiodic reference signal such that the aperiodic reference signal is not transmitted in a slot which overlaps a slot with the triggering DCI. One the UE detects the trigger to measure the aperiodic reference signal, the UE may determine a quasi co-location (QCL) association to use to receive the aperiodic reference signal. In some cases, the UE may be indicated a transmit configuration indicator (TCI) state for the aperiodic reference signal resource in the DCI, and the UE may be expected to apply the indicated QCL assumption if there is a large enough gap between the triggering control channel and the resources for the aperiodic reference signal.

If the offset between the triggering DCI and the aperiodic reference signal is too short, the UE may instead use a default QCL assumption to receive the aperiodic reference signal. In some cases, the UE may use the QCL assumption of another downlink signal scheduled for the UE on the same symbol, or the UE may determine a default QCL assumption based on a configured control resource set (CORESET) for the second component carrier. Techniques described herein support a UE to identify a default QCL assumption for receiving an aperiodic cross-carrier reference signal when the UE 115 does not have a control resource set configured on component carrier with the aperiodic reference signal. Techniques are described for the UE to identify a default QCL assumption when the UE has one or more configured TCI states for the second component carrier, and techniques are described for the UE to identify a default QCL assumption when the UE does not have any configured TCI states on the second component carrier.

Aspects of the disclosure are initially described in the context of a wireless communications system. Aspects of the disclosure are further illustrated by and described with reference to apparatus diagrams, system diagrams, and flowcharts that relate to default quasi co-location assumption for cross carrier reference signal triggering.

FIG. 1 illustrates an example of a wireless communications system 100 that supports default quasi co-location assumption for cross carrier reference signal triggering in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A)

network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A UE 115 may be configured with multiple component carriers, such as in a carrier aggregation configuration. A base station 105 may transmit DCI on a first component carrier which triggers the transmission of an aperiodic reference signal on the second component carrier. In an example, the DCI may trigger the UE 115 to measure a CSI-RS on the second component carrier. The first component carrier and the second component carrier may have different numerologies. In some cases, the first component carrier may have a lower SCS than the second component carrier, or the first and second carriers may be in different frequency ranges. The difference in numerologies may affect an offset between the DCI and the aperiodic reference signal. For example, the wireless communications system may support an offset between the triggering DCI and the aperiodic reference signal such that the aperiodic reference signal is not transmitted in a slot which overlaps a slot with the triggering DCI.

Once the UE 115 detects the trigger to measure the aperiodic reference signal, the UE 115 may determine a QCL association to use to receive the aperiodic reference signal. In some cases, the UE 115 may be indicated a TCI state for the aperiodic reference signal resource in the DCI. If there is a large enough gap between the triggering control channel and the resources for the aperiodic reference signal, the UE 115 may be expected to apply the indicated QCL assumption. If the offset between the triggering DCI and the aperiodic reference signal is too short, the UE 115 may instead use a default QCL assumption to receive the aperiodic reference signal. Techniques described herein support a UE 115 to identify a default QCL assumption for receiving an aperiodic cross-carrier reference signal when the UE 115 does not have a control resource set configured on component carrier with the aperiodic reference signal. Techniques are described for the UE 115 to identify a default QCL assumption when the UE 115 has one or more configured TCI states for the second component carrier, and techniques are described for the UE 115 to identify a default QCL assumption when the UE 115 does not have any configured TCI states on the second component carrier.

Figure 2:
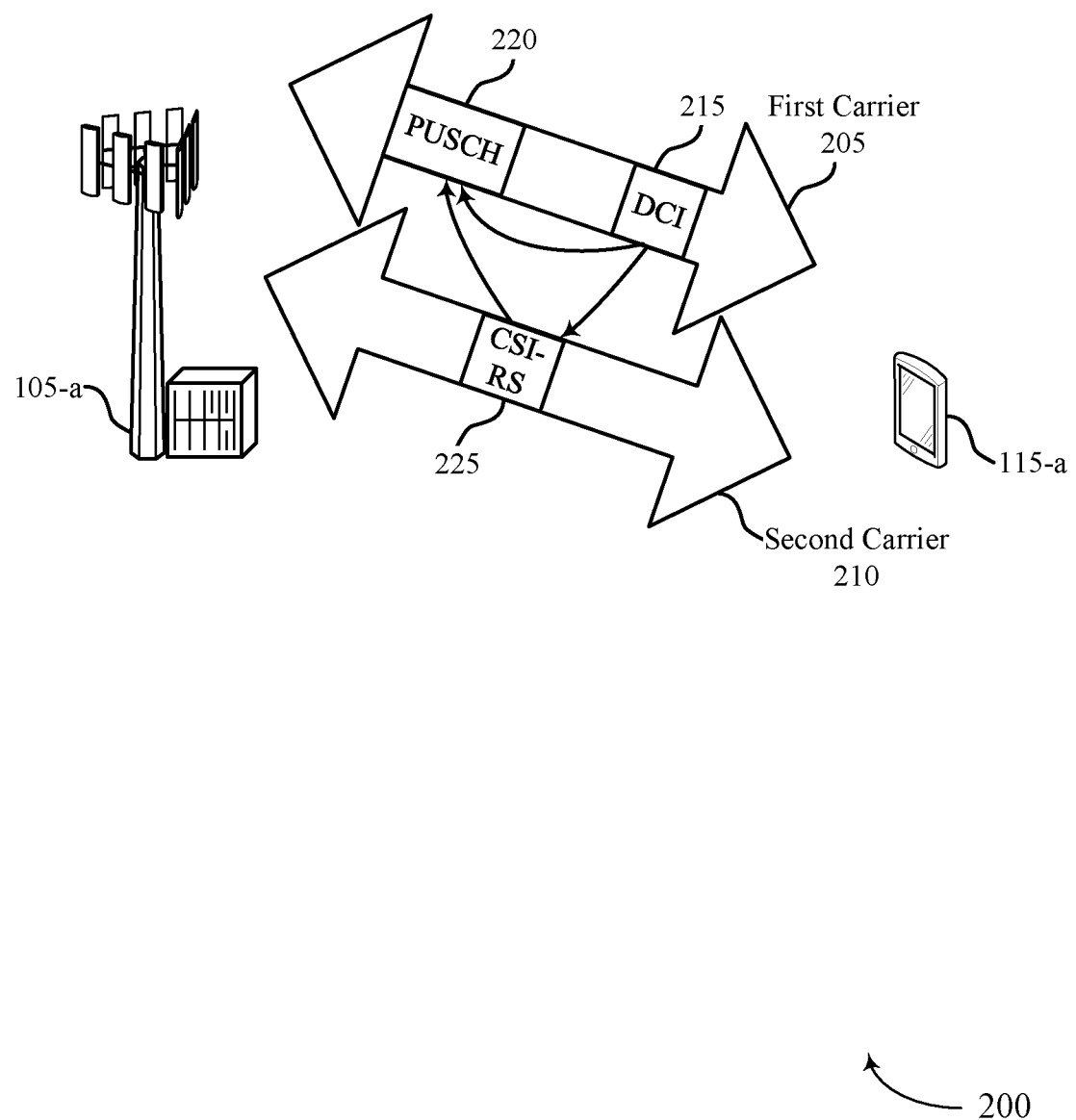
FIG. 2 illustrates an example of a wireless communications system that supports default quasi co-location assumption for cross carrier reference signal triggering in accordance with aspects of the present disclosure.

FIG. 2 illustrates an example of a wireless communications system 200 that supports default quasi co-location assumption for cross carrier reference signal triggering in accordance with aspects of the present disclosure. In some examples, wireless communications system 200 may implement aspects of wireless communication system 100. The wireless communications system 200 includes UE 115-a and base station 105-a, which may be respective examples of a UE 115 and a base station 105 as described with reference to FIG. 1.

The wireless communications system 200 may support wireless communications implementing a carrier aggregation scheme. For example, UE 115-a may be configured with multiple component carriers, including a first carrier 205 and a second carrier 210. In some cases, a single base station 105 may provide multiple carriers (e.g., as base station 105-a provides the first carrier 205 and the second carrier 210), or the carrier may be provided by different base stations 105.

In some cases, the first carrier 205 and the second carrier 210 may correspond to different frequency ranges. For example, the first carrier 205 may be in a lower frequency range (e.g., Frequency Range 1 (FR1)), and the second carrier 210 may be in a higher frequency range (e.g., Frequency Range 2 (FR2), Frequency Range 3 (FR3), Frequency Range 4 (FR4), etc.). In some cases, the first carrier 205 and the second carrier 210 may be within the same frequency range, but they may not be adjacent in frequency. For example, in some cases the first carrier 205 may be closer to a lower frequency end of FR2 and the second carrier 210 may closer a higher frequency end of FR2.

The wireless communications system 200 may support cross-carrier aperiodic CSI-RS measurement. For example, base station 105-a may transmit downlink control information (DCI) 215 on a physical downlink control channel (PDCCH) of the first carrier 205 which triggers the transmission of an aperiodic reference signal on the second carrier 210. The DCI 215 may trigger UE 115-a to measure a CSI-RS 225 on the second carrier 210. Therefore, the aperiodic CSI-RS is triggered on the first carrier 205, but UE 115-a measures the CSI-RS 225 on the second carrier 210. In some cases, the DCI 215 may schedule an uplink shared channel on the first carrier 205, such as a physical uplink shared channel (PUSCH) 220, and UE 115-a transmit a CSI-RS report on the PUSCH 220.

The first carrier 205 and the second carrier 210 may have different numerologies. In some cases, the first carrier 205 may have a lower subcarrier spacing (SCS) than the second carrier 210. For example, the first carrier 205 may have an SCS of 30 KHz, and the second carrier 210 may have an SCS of 120 KHz. In some cases, the difference in numerologies of the two carriers may affect an offset between the DCI 215 and the CSI-RS 225.

For example, for cross-carrier aperiodic CSI-RS triggering schemes across component carriers with different numerologies, there may be some complexity related to buffering in the carrier containing the CSI-RS. For example, a UE 115 may buffer data for slots in the higher numerology component carrier in anticipation of a potential CSI-RS trigger from a lower numerology. To reduce the amount of buffering at the UE 115, the wireless communications system may limit CSI-RS triggering offsets so that a CSI-RS occurs only for later slots than the last slot overlapping the PDCCH slot. An example of the CSI-RS trigger offset is described in more detail with respect to FIG. 3.

UE 115-a may also determine a QCL association to use to receive the CSI-RS 225. In some cases, UE 115-a may be indicated a TCI state for the CSI-RS resource in the DCI 215, and UE 115-a may be expected to apply the indicated QCL assumption if there is a large enough gap between the PDCCH carrying the DCI 215 and the resources for the CSI-RS 225. For example, if the CSI-RS trigger offset exceeds a TCI state application threshold or a QCL determination threshold, UE 115-a may use a TCI state indicated in the DCI 215. The TCI state application threshold may be based on a UE capability for beam switching timing and a relationship between the PDCCH SCS and the CSI-RS SCS.

If, however, the CSI-RS trigger offset is shorter than the TCI state application threshold, UE 115-a may use a default QCL assumption to receive the CSI-RS. In some cases, there may be another downlink signal for UE 115-a on the same symbol, and UE 115-a may use the QCL association of the channel carrying the downlink signal. For example, if UE 115-a is scheduled for a physical downlink shared channel (PDSCH) transmission on the same symbol as the CSI-RS, UE 115-a may use the same QCL assumption to receive the CSI-RS as used to receive the PDSCH transmission. If there is not a downlink signal on the same symbol, UE 115-a may use the QCL assumption associated with a lowest control resource set ID.

There may be some configurations in some wireless communications systems where a UE 115 cannot use a TCI state indicated in the DCI, but the UE 115 may not have another QCL assumption to use as the configured default QCL assumption. For example, the UE 115 may be expected to use a default QCL assumption, but the UE 115 may not be configured with a control resource set on the second carrier or a TCI state for the second carrier. For example, UE 115-a may not have a configured control resource set for the second carrier 210, as the configurations and triggers may be signaled via the first carrier 205.

UE 115-a may implement techniques to identify a default QCL assumption to receive a cross-carrier CSI-RS when a control resource set is not configured for the carrier used to transmit the CSI-RS. For example, if UE 115-a is not configured with a control resource set on the second carrier 210, UE 115-a may implement the techniques described herein to identify a default QCL assumption for receiving the CSI-RS 225 on the second carrier 210. UE 115-a may implement techniques to identify a default QCL in these situations based on whether or not there is at least one configured TCI state for the second carrier 210.

In some cases, there may be at least one configured TCI state for the second carrier 210. In a first example, the default QCL assumption for the aperiodic CSI-RS on the second carrier 210 may be the same as the default QCL assumption for a PDSCH on the second carrier 210. For example, if the control resource set for the second carrier 210 is not configured, UE 115-a may apply the QCL assumption of the activated TCI state with the lowest identifier applicable to PDSCH to receive the aperiodic CSI-RS 225 transmission. In this example, UE 115-a may use a QCL assumption corresponding to a configured and active TCI state which is used for PDSCH reception on the second carrier 210. UE 115-a may, or may not, be scheduled for a PDSCH reception on the same symbol as the CSI-RS to use the QCL assumption for PDSCH to receive the CSI-RS 225. In some cases, the default QCL assumption may be associated with the default PDSCH TCI state with the lowest TCI ID.

In another example, UE 115-a may not be configured with a control resource set, but UE 115-a may be configured with one or more inactive TCI states. The default QCL for receiving the aperiodic CSI-RS 225 may be the TCI state configured in the second carrier 210 which has the lowest TCI state identifier. In some cases, this TCI state may not be activated (e.g., base station 105-a may not have transmitted a MAC CE to activate the TCI state), but UE 115-a may use this TCI state when determining a default QCL assumption to receive the CSI-RS 225 on the second carrier 210. In another example, UE 115-a may use the latest activated TCI state for the default QCL assumption. For example, UE 115-a may be configured with one or more TCI states for the second carrier 210. Of the configured TCI states for the second carrier 210, UE 115-a may use the most recently active TCI state for the default QCL assumption to receive the CSI-RS 225.

In some cases, UE 115-a may not be configured with a control resource set or any TCI states on the second carrier 210. In this example, the default QCL for receiving the aperiodic CSI-RS 225 may follow a synchronization signal block (SSB) selected in a latest random access procedure (e.g., random access channel (RACH) procedure) on the second carrier 210. By implementing these techniques, a UE 115 (e.g., such as UE 115-a) may identify a default QCL assumption for receiving an aperiodic CSI-RS when the timing gap between a PDCCH and the aperiodic CSI-RS is small enough that the UE 115 is expected to use a default QCL assumption, but the UE 115 is not configured with a control resource set that the UE 115 can use to identify the default QCL.

Figure 3:
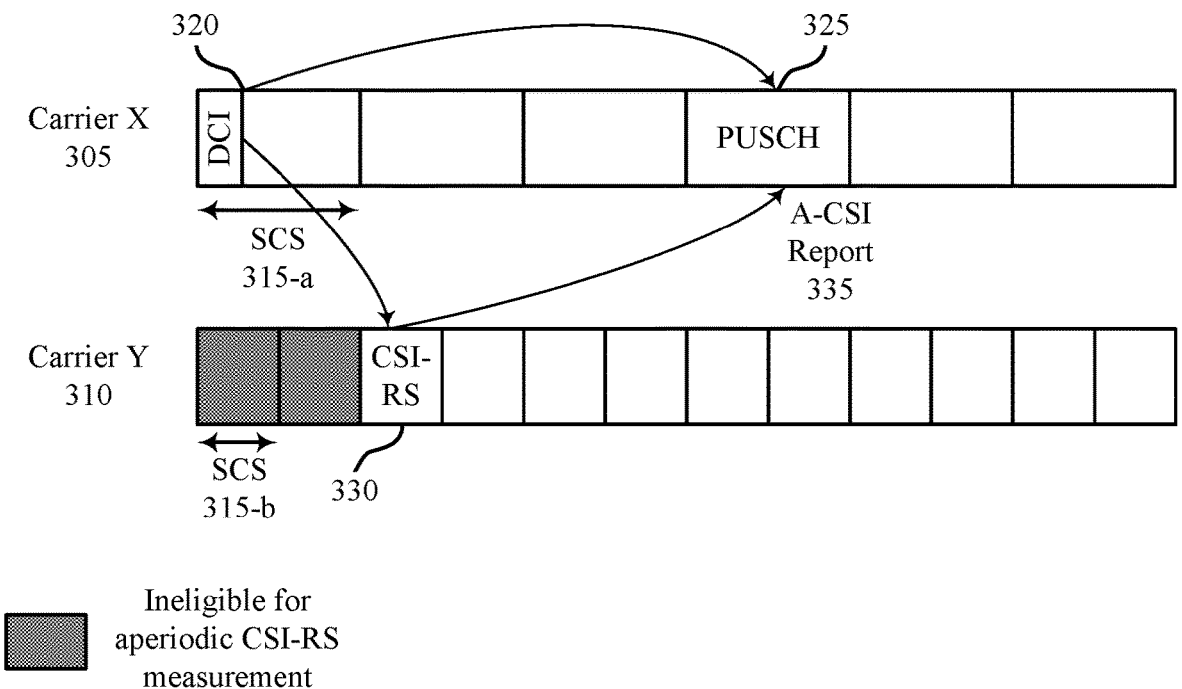
FIG. 3 illustrates an example of a cross-carrier channel state information (CSI) reference signal (CSI-RS) scheduling configuration that supports default quasi co-location assumption for cross carrier reference signal triggering in accordance with aspects of the present disclosure.

FIG. 3 illustrates an example of a cross-carrier CSI-RS scheduling configuration 300 that supports default quasi co-location assumption for cross carrier reference signal triggering in accordance with aspects of the present disclosure. In some examples, cross-carrier CSI-RS scheduling configuration 300 may implement aspects of wireless communication system 100. The cross-carrier CSI-RS scheduling configuration 300 may show some examples of communications between a UE 115 and a base station 105 on two separate carriers. For example, the UE 115 may be configured with a first carrier 305 (e.g., Carrier X) and a second carrier 310 (e.g., Carrier Y).

The first carrier 305 and the second carrier 310 may have different numerologies and may, in some cases, be located at different frequencies. In some cases, the carriers may be in different frequency ranges. For example, the first carrier 305 may be in FR1, and the second carrier 310 may be in FR2. In some examples, an SCS 315 for the second carrier 310 may be greater than an SCS 315 than the first carrier 305. For example, SCS 315-a may be 30 KHz, and SCS 315-b may be 60 KHz. Therefore, slots on the first carrier 305 may be twice as long as slots on the second carrier 310.

The UE 115 may receive a DCI 320 on the first carrier 305 which triggers the UE 115 to measure an aperiodic CSI-RS 330 on the second carrier 310. In some examples, the DCI 320 may schedule an uplink shared channel resource 325, on which the UE 115 may transmit an aperiodic CSI report 335 for the aperiodic CSI-RS 330. This technique, in some cases referred to as a cross-carrier aperiodic CSI measurement, may enable the UE 115 to receive DCI and scheduling information on one carrier (e.g., the first carrier 305) while making measurements for other component carriers (e.g., the second carrier 310), updating tracking configurations, mobility management, etc.

In some other examples, the UE 115 may be configured to measure the CSI-RS 330, but the UE 115 may not transmit a CSI-RS report 335. For example, the CSI-RS 330 may be transmitted to be used by the UE 115 for tracking, so there may not be an associated report. If there is no report, the UE 115 may just derive and process the measurements for other channels which may use the measurements. For example, if there is an aperiodic CSI-RS for tracking, the UE 115 may process the CSI-RS, derive the delay spread, doppler spread, average delay, and doppler shift. The UE 115 may use these measurements to process a PDSCH which uses the CSI-RS 330 for a QCL source.

In some cases, there may be a CSI-RS trigger offset. For example, there may be a minimum TTI offset between a downlink control channel carrying DCI 230 on the first carrier 305 and an earliest TTI on the second carrier 310 carrying the CSI-RS 330. The CSI-RS trigger offset may be implemented so that the UE 115 is not required to buffer data for slots in a carrier with a higher numerology in anticipation of a potential aperiodic CSI-RS from a lower numerology carrier. For example, the CSI-RS trigger offset may be configured such that the CSI-RS is transmitted a later slot than the last slot overlapping the PDCCH slot. In some cases, the CSI-RS trigger offset may be configured via a higher layer. For example, a parameter "aperiodicTriggeringOffset" may be indicated in an RRC message (e.g., for RRC configuration or reconfiguration).

In an example, the second carrier 310 may have a higher numerology than the first carrier 305. For example, the second carrier 310 may have twice as large of an SCS 315 as the first carrier 305 (e.g., SCS 315-*a* may be 60 KHz and SCS 315-*b* may be 30 KHz). The DCI 320 may be transmitted in a first slot on the first carrier 305, which may span the same amount of time as two slots on the second carrier 310. Therefore, the CSI-RS 330 may be transmitted during, at the earliest, the third slot of the second carrier 310. The first slot and the second slot on the second carrier 310 may be ineligible for aperiodic CSI-RS measurement, as the first and second slots on the second carrier 310 may overlap the first slot carrying the DCI 320 on the first carrier 305.

Figure 4:
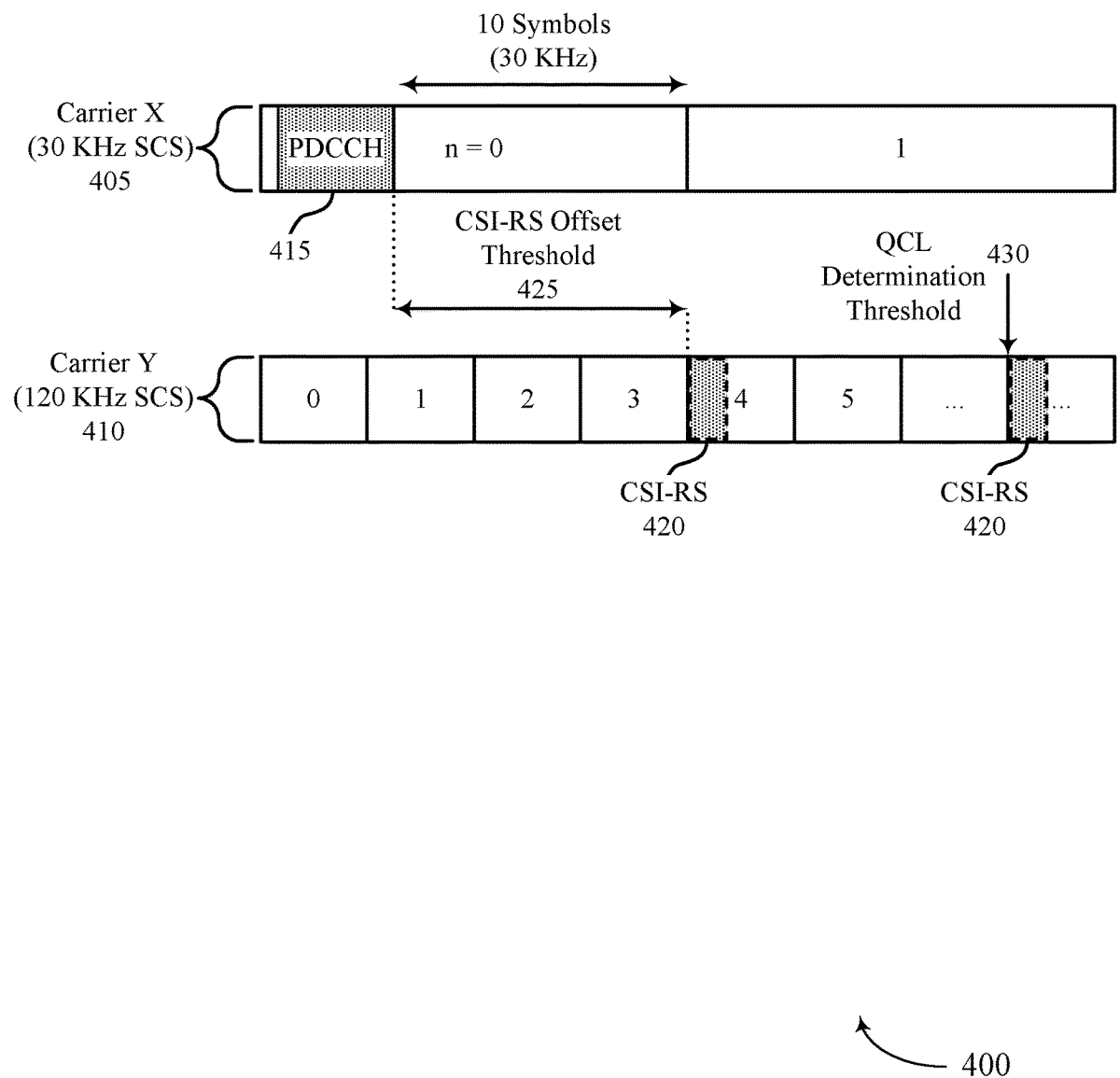
FIG. 4 illustrates an example of a cross-carrier CSI-RS scheduling configuration that supports default quasi co-location assumption for cross carrier reference signal triggering in accordance with aspects of the present disclosure.

FIG. 4 illustrates an example of a cross-carrier CSI-RS scheduling configuration 400 that supports default quasi co-location assumption for cross carrier reference signal triggering in accordance with aspects of the present disclosure. In some examples, cross-carrier CSI-RS scheduling configuration 400 may implement aspects of wireless communication system 100.

As described herein, a base station 105 may trigger an aperiodic CSI-RS measurement for a UE 115. The base station 105 may transmit a PDCCH 415 carrying DCI on a first carrier 405 and transmit a CSI-RS 420 on a second carrier 410. The first carrier 405 may have a first numerology with a first SCS, and the second carrier 410 may have a second numerology with a second SCS. The second carrier 410 may have a larger SCS than the first carrier 405. For example, the second carrier 410 may have an SCS of 120 KHz, and the first carrier 405 may have an SCS of 30 KHz. To prevent the UE 115 from constantly buffering data on the second carrier 410, there may be a CSI-RS trigger offset 425 between the PDCCH 415 carrying DCI to trigger the aperiodic CSI measurement and an aperiodic CSI-RS 420.

In some cases, the PDCCH 415 may be transmitted in a first few symbols of a slot. For example, the PDCCH 415 may be restricted to being transmitted in the first four symbols of a slot. When the PDCCH SCS (e.g., the SCS of the first carrier 405) is smaller than the CSI-RS SCS (e.g., the SCS of the second carrier 410), the UE 115 may not expect a triggering DCI in the last 10 symbols of the slot. In some cases, the CSI-RS triggering offset 425 may have a range of 0 to 4 slots.

A parameter indicating the aperiodic triggering offset 425 may be determined based on the numerology of the aperiodic CSI-RS 420. The aperiodic CSI-RS may be transmitted in slot n+X if the PDCCH SCS is smaller than the CSI-RS SCS and $$(n+1)\frac{2^{\mu_{CSIRS}}}{2^{\mu_{PDCCH}}} + X$$

if the PDCCH SCS is smaller than the CSI-RS SCS, where X may be the CSI-RS triggering offset configured per resource by a higher layer parameter. If the SCS for the carrier used to transmit PDCCH is smaller than the SCS of the carrier used to transmit the CSI-RS, the slot offset X may be given in terms of the numerology of the aperiodic CSI-RS. In some cases where the PDCCH SCS is equal to the CSI-RS SCS, the CSI-RS triggering offset X may be fixed to zero if all the associated trigger states do not have the higher layer parameter "qcl-Type" set to "QCL-TypeD" in the corresponding TCI states.

The offset may be relative to a reference slot, n', which may be derived based on Equation 1 below, where n is the slot with the triggering DCI in the numerology of the PDCCH containing the triggering DCI, X is the CSI-RS triggering offset 425 in the numerology of CSI-RS according to the higher layer parameter, and $\mu_{CSIRS}$ and $\mu_{PDCCH}$ are the subcarrier spacing configurations for CSI-RS and PDCCH respectively. The reference slot may be subsequent to the latest slot in the CSI-RS numerology overlapping with slot n of the triggering PDCCH in the PDCCH numerology.

$$n' = (n+1) * \frac{2^{\mu_{CSIRS}}}{2^{\mu_{PDCCH}}} \quad (1)$$

In an example, the SCS for the PDCCH may be 15 KHz, and the SCS for the CSI-RS may be 60 KHz. According to Equation 1, the minimum gap between the last symbol of PDCCH and the first symbol of CSI-RS may be 40 symbols on the carrier with 60 KHz SCS. Other examples are shown by Table 1 below.

TABLE 1

| | CSIRS SCS = 60 KHz | CSIRS SCS = 120 KHz |
|---|---|---|
| PDCCH SCS = 15 KHz | 40 Symbols in 60 KHz SCS | 80 Symbols in 120 KHz SCS |
| PDCCH SCS = 30 KHz | 20 Symbols in 60 KHz SCS | 40 Symbols in 120 KHz SCS |
| PDCCH SCS = 60 KHz | 0 Symbols | 20 Symbols in 120 KHz SCS |

As described, the PDCCH 415 may be transmitted in, at the latest, the 4th symbol of a slot on the first carrier 405. Therefore, there may be 10 symbols between the end of the PDCCH 415 and the beginning of the next slot on the first carrier 405. If the numerology for the second carrier 410 is twice that of the numerology of the first carrier 405 (e.g., 60 KHz and 30 KHz, respectively), then 10 symbols on the first carrier 405 may correspond to 20 symbols on the second carrier 410. Similarly, 10 symbols on the first carrier 405 may correspond to 40 symbols on the second carrier 410 if the SCS on the second carrier 410 is four times that of the SCS on the first carrier 405, etc. In the illustrated example shown, the second carrier 410 may have four times the SCS of the first carrier 405, so CSI-RS triggering offset 425 may correspond to Slot 4 of the second carrier 410, which has the same start time as Slot 1 on the first carrier 405. In some cases, the aperiodic triggering offset of the CSI interference measurement may follow the offset of the associated non-zero power CSI-RS for channel measurement.

The UE 115 may select a beam configuration to receive the CSI-RS 420. The beam configuration may be based on a QCL assumption that the UE 115 applies to receive the CSI-RS 420. For example, the UE 115 may assume that a similar beam configuration can be used to receive the CSI-RS 420 as was used to communicate other signaling. In some cases, the DCI transmitted on the PDCCH 415 may indicate a TCI state for the aperiodic CSI-RS resources. With sufficient time between the PDCCH 415 and the CSI-RS 420, the UE 115 may be expected to apply the QCL assumptions in the indicated TCI states for the aperiodic CSI-RS resources.

In an example, the UE 115 may be expected to apply the QCL assumptions indicated in the TCI states if the scheduling offset between the last symbol of the PDCCH 415 and the first symbol of the aperiodic CSI-RS 420 exceeds a threshold. The threshold may be equal to Y+d, where Y may correspond to a UE-reported threshold for beam switch timing, and d may be determined based on the numerologies of the first carrier 405 and the second carrier 410. The value Y may be, for example, 14 symbol periods, 28 symbol periods, 48 symbol periods, 56 symbol periods, etc. The value d may be determined based on Equation 2 below (e.g., if the PDCCH SCS is less than or equal to the CSI-RS SCS). The threshold may be in terms of the numerology of the aperiodic CSI-RS 420.

$$d = 14 \frac{2^{\mu_{CSIRS}}}{2^{\mu_{PDCCH}}} \qquad (2)$$

In this example, the minimum scheduling offset for applying the QCL assumptions indicated in the TCI states may be 84 symbols. The UE 115 may have a beam switch timing capability of 28 symbol periods (e.g., Y=28), and the SCS for the second carrier 410 may be four times that of the SCS for the first carrier 405 (e.g., d=56). Therefore, if the CSI-RS 420 is scheduled after a QCL determination threshold 430, the UE 115 may use a TCI state as indicated in the PDCCH 415 for the QCL assumption. In some cases, d may be set to 0 if the PDCCH SCS is equal to the CSI-RS SCS.

If the CSI-RS 420 is scheduled before the QCL determination threshold 430, the UE 115 may use a default QCL assumption. If there is another downlink signal on the same symbol as the CSI-RS 420, the UE 115 may use the QCL of the channel carrying the downlink signal. For example, the UE 115 may be scheduled to receive a PDSCH message on the same symbol as the CSI-RS 420, and the UE 115 may use the QCL of the PDSCH to receive the CSI-RS 420. Therefore, if there is any other downlink signal with an indicated TCI state in the same symbol as the CSI-RS, the UE 115 may apply the QCL assumption of the other downlink signal when receiving the aperiodic CSI-RS. In some cases, the other downlink signal may refer to a PDSCH scheduled with an offset larger than or equal to the QCL determination threshold 430. If there is not another downlink signal on the same symbol, the UE 115 may use a QCL assumption based on a configured control resource set with the lowest control resource set identifier (e.g., control resource set 0) or some other TCI state (e.g., a lowest TCI state, a special activated TCI, etc.).

In some cases, however, the UE 115 may not have a control resource set configured for the second carrier 410. Additionally, or alternatively, the UE 115 may not have any configured TCI states for the second carrier 410. In these examples, a conventional UE 115 may not have an appropriate default QCL assumption. However, a UE 115 may implement the techniques described herein to apply a QCL assumption to receive the CSI-RS 420 on the second carrier 410, even if the UE 115 does not have a control resource set configured for the second carrier 410.

In an example, a UE 115 may be configured to apply a default QCL assumption to receive the CSI-RS 420. The UE 115 may be configured with one or more TCI states, but the UE 115 may not be configured with a control resource. In a first example, the default QCL for the aperiodic CSI-RS 420 may be the same as a default QCL assumption for PDSCH for the second carrier 410. The UE 115 may or may not be scheduled for another downlink signal to use the default QCL assumption for PDSCH. In some cases, this default QCL assumption may correspond to a TCI state which has been configured and activated by a MAC CE. The default QCL assumption may correspond to the activated PDSCH TCI state with a lowest TCI state identifier.

In another example of the UE 115 having configured TCI states but no configured control resource set, the default QCL assumption for the aperiodic CSI-RS may correspond to the TCI state with the lowest TCI state identifier configured for the second carrier 410. This TCI state may be configured at the UE 115, but may not be activated. In another example, the UE 115 may use the latest activated TCI state for the second carrier 410. For example, the UE 115 may not currently have any activated TCI states for the second carrier 410, but the UE 115 may have previously had an activated TCI state for the second carrier 410. The UE 115 may use the most recently active TCI state for the default QCL assumption.

In some cases, the UE 115 may not be configured with any TCI states or a control resource set for the second carrier 410. In this example, the default QCL assumption to receive the aperiodic CSI-RS 420 may be based on the SSB selected for the latest random access procedure on the second carrier 410.

Figure 5:
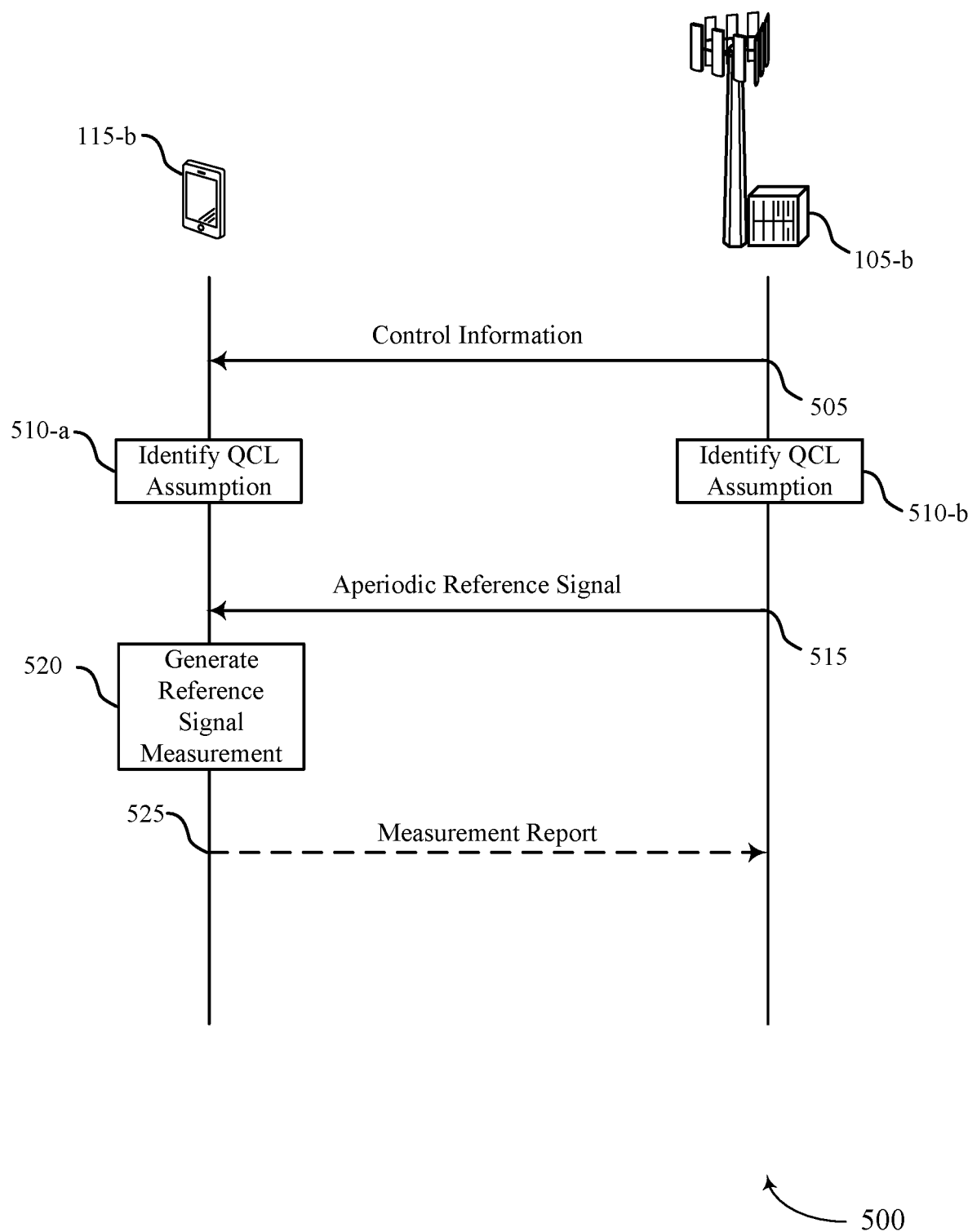
FIG. 5 illustrates an example of a process flow that supports default quasi co-location assumption for cross carrier reference signal triggering in accordance with aspects of the present disclosure.

FIG. 5 illustrates an example of a process flow 500 that supports default quasi co-location assumption for cross carrier reference signal triggering in accordance with aspects of the present disclosure. In some examples, process flow 500 may implement aspects of wireless communication system 100.

UE 115-*b* and base station 105-*b* may support cross-carrier aperiodic CSI measurement. UE 115-*b* may be configured with a first component carrier and a second component carrier. The first and second component carriers may, in some cases, be in different frequency ranges. For example, the first component carrier may be in FR1, and the second component carrier may be in FR2, FR3, FR4, FR5, or FR6.

At 505, UE 115-*b* may receive, via the first component carrier, control information that triggers transmission of an aperiodic reference signal in the second component carrier. UE 115-*b* may apply a QCL assumption to receive the aperiodic CSI-RS. In some cases, the control information that triggers the aperiodic reference signal may include a TCI state indication. If a timing gap between the control information and the resources for the aperiodic CSI-RS exceed a QCL determination threshold, UE 115-*b* may apply a QCL assumption based on the TCI state indication in the control signaling. However, if the timing gap between the control information and CSI-RS is not long enough (e.g., and shorter than the QCL determination threshold), UE 115-*b* may use a default QCL assumption to receive the CSI-RS. Some techniques described herein may be applied when UE 115-*b* is to use a default QCL assumption to receive a cross-carrier CSI-RS, but UE 115-*b* does not have a configured control resource set to determine the default QCL assumption.

At 510-*a*, UE 115-*b* may identify a QCL assumption for reception of the aperiodic reference signal in the second component carrier based on a control resource set not being configured for the second component carrier. At 510-*b*, base station 105-*b* may identify a QCL assumption for transmission of the aperiodic reference signal in the second component carrier based on a control resource set not being configured for UE 115-*b* for the second component carrier.

In some cases, UE 115-*b* may have not have a control resource set configured for the second component carrier, but UE 115-*b* may have one or more configured TCI states for the second component carrier. For example, UE 115-*b* may receive control signaling that indicates a set of (e.g., one or more) configured TCI states for a shared data channel of the second component carrier, where the identified QCL assumption is the same as a QCL assumption corresponding to a first TCI state of the set of configured TCI states. In some cases, the QCL assumption corresponding to the first TCI state may be configured for a downlink shared channel. For example, UE 115-*b* may receive a control message indicating that the first TCI state is an activated TCI state with a lowest valued identifier, and UE 115-*b* may use the activated TCI state for a QCL assumption to receive the aperiodic reference signal.

In another example, UE 115-*b* may receive control signaling that indicates a set of configured TCI states for the second component carrier, where the identified QCL assumption is the same as a QCL assumption corresponding to a first TCI state of the set of configured TCI states. For example, the first TCI state has a lowest identifier in a set of identifiers that respectively correspond to the set of configured TCI states. In another example, the first TCI state is a latest activated TCI state of the set of configured TCI states.

In some cases, UE 115-*b* may have performed a random access procedure on the second component carrier after detecting an SSB in the second component carrier. In some cases, the random access procedure may have been performed to establish an RRC connection with base station 105-*b* for the second component carrier or for other signaling. In some cases, the identified QCL assumption may be the same QCL assumption for the SSB.

At 515, base station 105-*b* may transmit the aperiodic reference signal to UE 115-*b*. In some cases, a CSI-RS may be an example of the aperiodic reference signal. UE 115-*b* may monitor for the aperiodic reference signal based on the identified QCL assumption. In some cases, at 520, UE 115-*b* may generate a reference signal measurement for the aperiodic reference signal of the second component carrier based on the QCL assumption.

In some example, UE 115-*b* may transmit a measurement report that indicates the reference signal measurement at 525. In some examples, the aperiodic reference signal may not trigger a measurement report. For example, UE 115-*b* may derive a channel metric that includes one or more of delay spread, doppler spread, average delay, doppler shift, or any combination thereof, based on the reference signal measurement. UE 115-*b* may then decode a shared data channel that uses the aperiodic reference signal as a QCL source.

Figure 6:
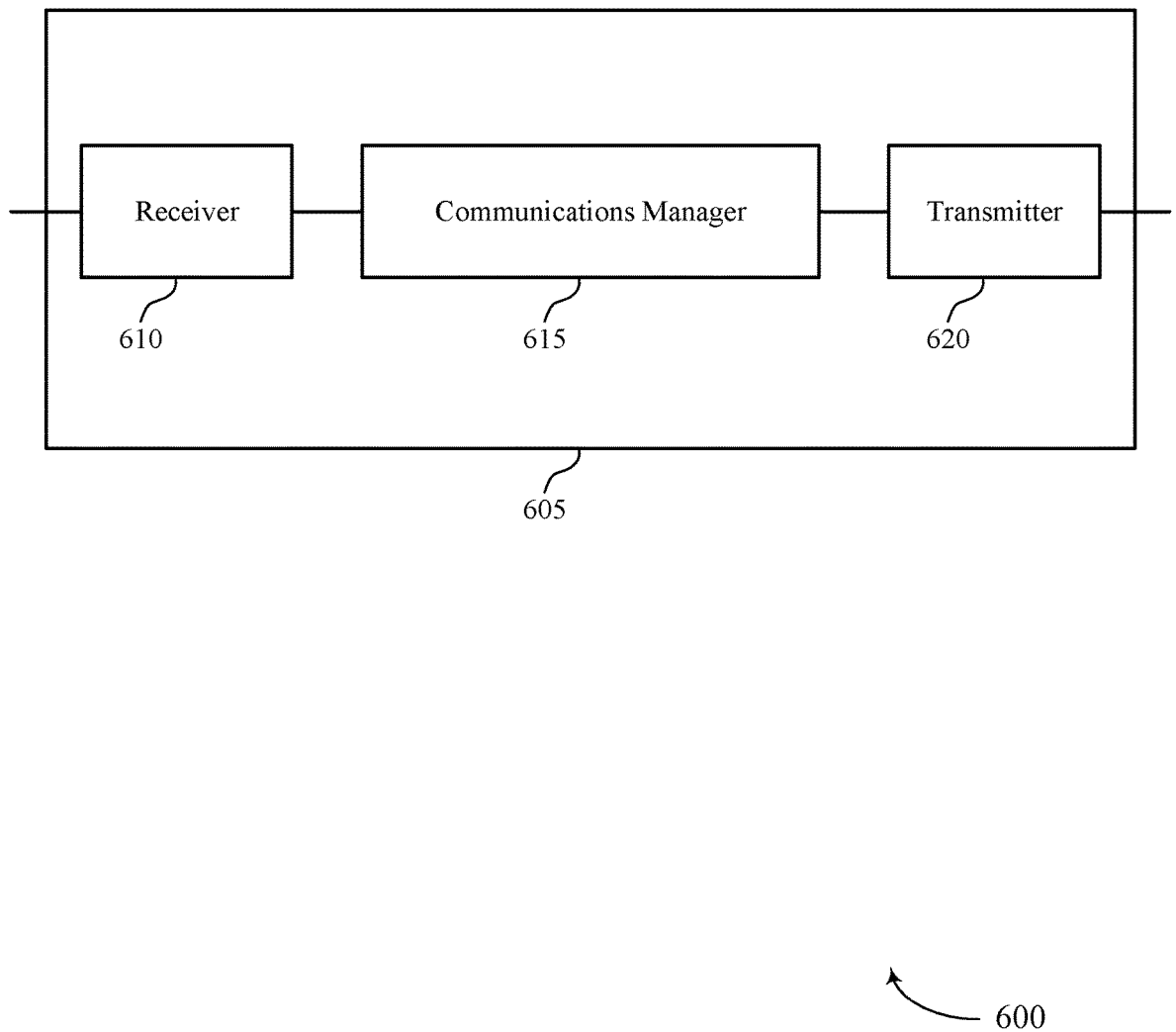
FIGS. 6 and 7 show diagrams of devices that support default quasi co-location assumption for cross carrier reference signal triggering in accordance with aspects of the present disclosure.

FIG. 6 shows a diagram 600 of a device 605 that supports default quasi co-location assumption for cross carrier reference signal triggering in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to default quasi co-location assumption for cross carrier reference signal triggering, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may receive, via a first component carrier, control information that triggers transmission of an aperiodic reference signal in a second component carrier, identify a quasi co-location assumption for reception of the aperiodic reference signal in the second component carrier based on a control resource set not being configured for the second component carrier, and receive the aperiodic reference signal of the second component carrier based on the quasi co-location assumption. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The actions performed by the communications manager 615 as described herein may be implemented to realize one or more potential advantages. One implementation may allow a UE 115 to apply a default QCL assumption to improve reception quality when receiving an aperiodic reference signal. By using a default QCL assumption for beamforming configurations, the UE 115 may receive the aperiodic reference signal with higher signal strength or signal quality. This may enable the UE 115 to measure, and in some cases report, accurate channel characteristics for different carriers (e.g., newly established carriers, secondary carriers, etc.) than a carrier (e.g., a primary carrier) used to transmit downlink control signaling.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
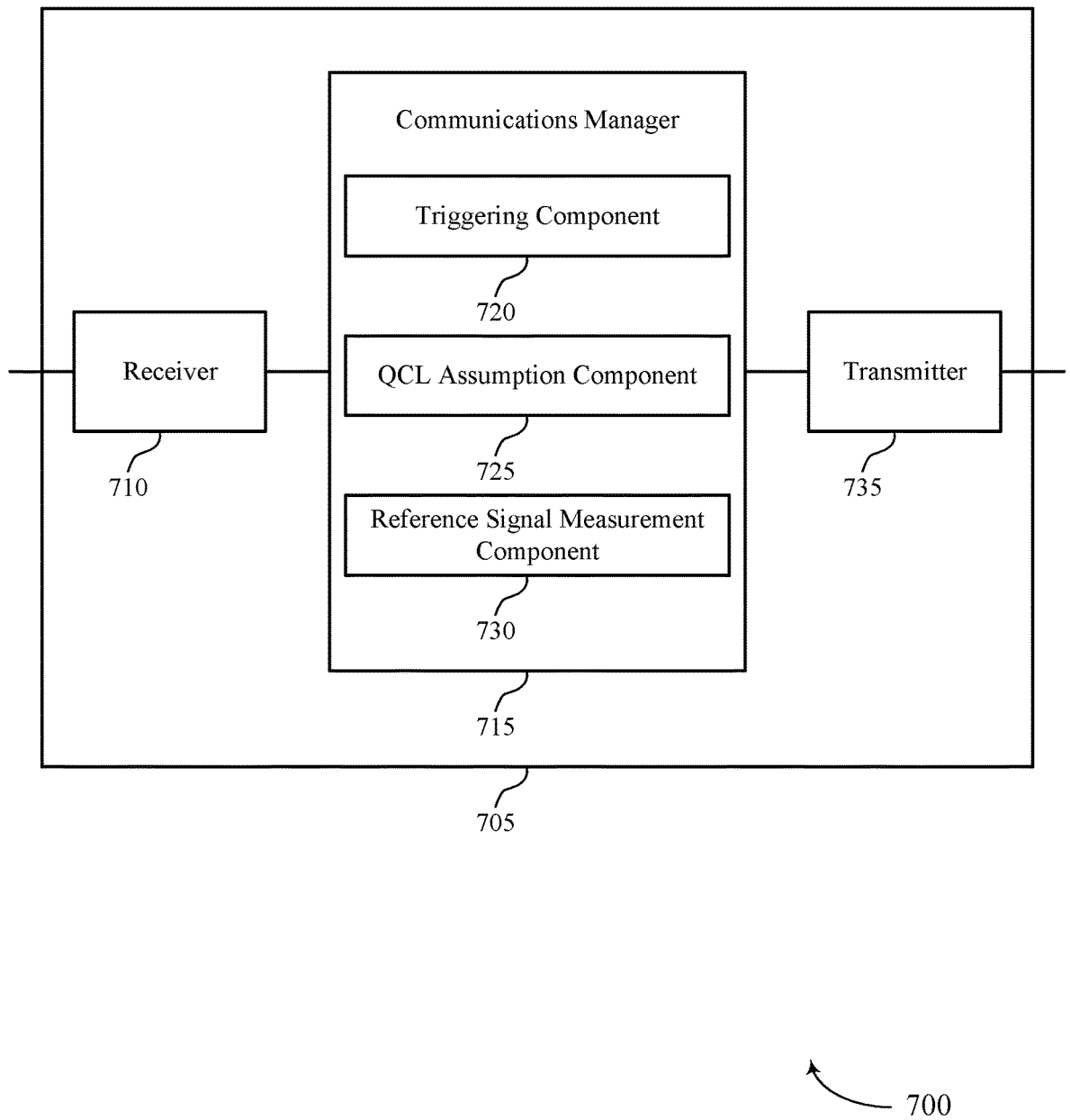

FIG. 7 shows a diagram 700 of a device 705 that supports default quasi co-location assumption for cross carrier reference signal triggering in accordance with aspects of the present disclosure. The device 705 may be an example of aspects of a device 605, or a UE 115 as described herein. The device 705 may include a receiver 710, a communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to default quasi co-location assumption for cross carrier reference signal triggering, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a triggering component 720, a QCL assumption component 725, and a reference signal measurement component 730. The communications manager 715 may be an example of aspects of the communications manager 910 described herein.

The triggering component 720 may receive, via a first component carrier, control information that triggers transmission of an aperiodic reference signal in a second component carrier.

The QCL assumption component 725 may identify a quasi co-location assumption for reception of the aperiodic reference signal in the second component carrier based on a control resource set not being configured for the second component carrier.

The reference signal measurement component 730 may receive the aperiodic reference signal of the second component carrier based on the quasi co-location assumption.

The transmitter 735 may transmit signals generated by other components of the device 705. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or a set of antennas.

Figure 8:
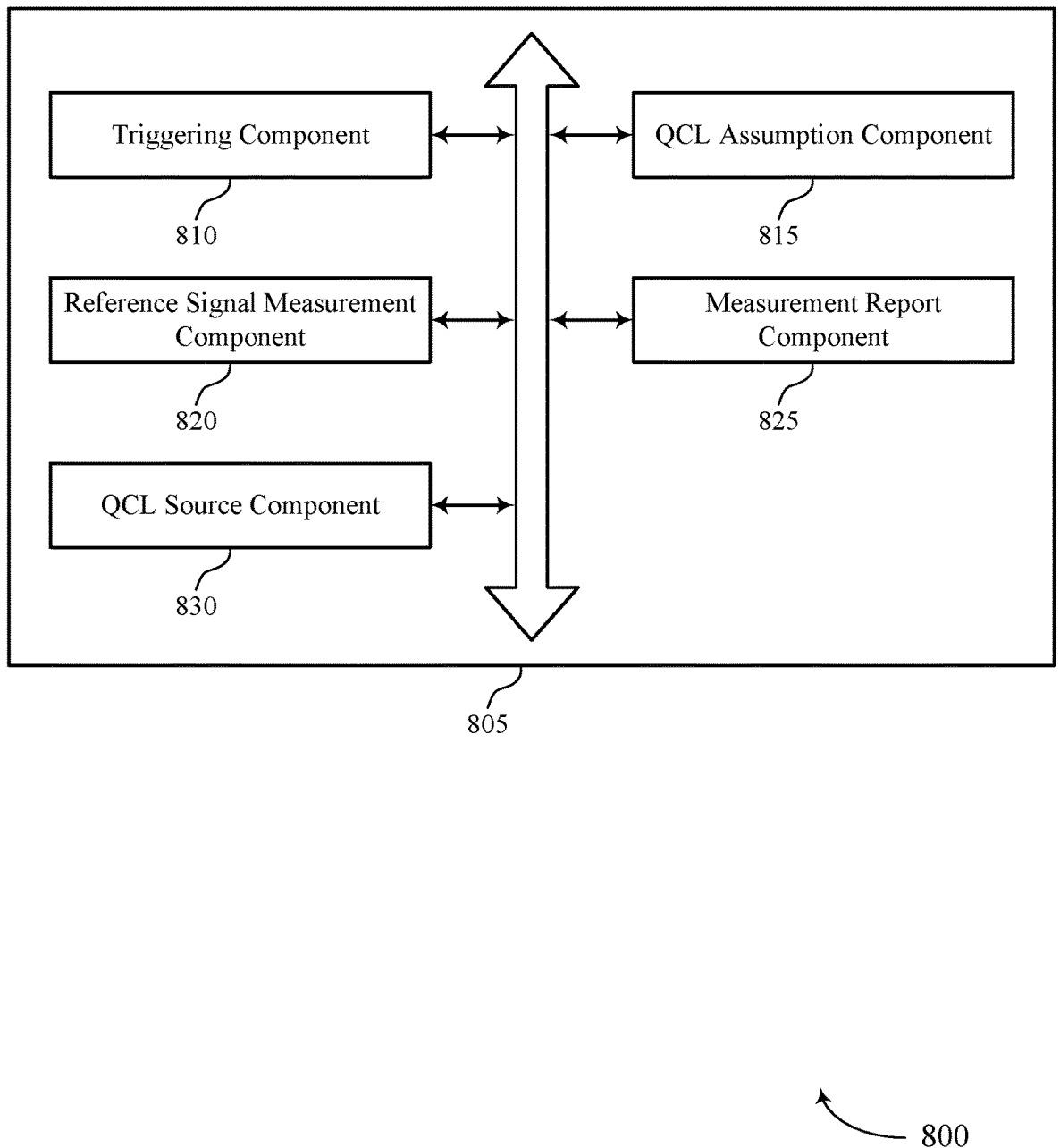
FIG. 8 shows a diagram of a communications manager that supports default quasi co-location assumption for cross carrier reference signal triggering in accordance with aspects of the present disclosure.

FIG. 8 shows a diagram 800 of a communications manager 805 that supports default quasi co-location assumption for cross carrier reference signal triggering in accordance with aspects of the present disclosure. The communications manager 805 may be an example of aspects of a communications manager 615, a communications manager 715, or a communications manager 910 described herein. The communications manager 805 may include a triggering component 810, a QCL assumption component 815, a reference signal measurement component 820, a measurement report component 825, and a QCL source component 830. Each of these modules may communicate, directly or indirectly, with one another (e.g., via one or more buses).

The triggering component 810 may receive, via a first component carrier, control information that triggers transmission of an aperiodic reference signal in a second component carrier.

In some examples, the triggering component 810 may receive, via the first component carrier having a first numerology, the control information that triggers transmission of the aperiodic reference signal in the second component carrier that has a second numerology that differs from the first numerology.

In some examples, the triggering component 810 may receive, via the first component carrier that is an FR1 component carrier that has a first numerology, the control information that triggers transmission of the aperiodic reference signal in the second component carrier that has a second numerology that differs from the first numerology.

In some examples, the triggering component 810 may receive, via the first component carrier that is an FR2 component carrier, or an FR3 component carrier, or an FR4 component carrier, the control information that triggers transmission of the aperiodic reference signal in the second component carrier that is a frequency range 2 (FR2) component carrier, or a FR3 component carrier, or a FR4 component carrier.

In some examples, the triggering component 810 may receive, via the first component carrier, the control information that triggers transmission of the aperiodic reference signal in the second component carrier that is a frequency range 2 (FR2) component carrier, or a frequency range 3 (FR3) component carrier, or a frequency range 4 (FR4) component carrier.

In some examples, the triggering component 810 may receive, via the first component carrier, the control information that is downlink control information that triggers transmission of the aperiodic reference signal in the second component carrier.

The QCL assumption component 815 may identify a quasi co-location assumption for reception of the aperiodic reference signal in the second component carrier based on a control resource set not being configured for the second component carrier.

In some examples, the QCL assumption component 815 may receive control signaling that indicates a set of configured transmission configuration indicator states for a shared data channel of the second component carrier, where the identified quasi co-location assumption is the same as a quasi co-location assumption corresponding to a first transmission configuration indicator state of the set of configured transmission configuration indicator states.

In some examples, the QCL assumption component 815 may receive a control message that indicates that the first transmission configuration indicator state is an activated transmission configuration indicator state with a lowest identifier of a set of identifiers corresponding to the one or more configured transmission configuration indicator states.

In some examples, the QCL assumption component 815 may receive the control message that is a medium access control (MAC) control element (CE).

In some examples, the QCL assumption component 815 may receive the control signaling that is radio resource control signaling that indicates the set of configured transmission configuration indicator states.

In some examples, the QCL assumption component 815 may receive control signaling that indicates a set of configured transmission configuration indicator states for the second component carrier, where the identified quasi co-location assumption is the same as a quasi co-location assumption corresponding to a first transmission configuration indicator state of the set of configured transmission configuration indicator states.

In some examples, the QCL assumption component 815 may perform a random access procedure on the second component carrier after detecting a synchronization signal block in the second component carrier, where the identified quasi co-location assumption is the same as a quasi co-location assumption for the synchronization signal block.

In some cases, the first transmission configuration indicator state that has a lowest identifier in a set of identifiers that respectively correspond to the set of configured transmission configuration indicator states.

In some cases, the first transmission configuration indicator state is a latest activated transmission configuration indicator state of the set of configured transmission configuration indicator states.

The reference signal measurement component 820 may generate a reference signal measurement for the aperiodic reference signal of the second component carrier based on the quasi co-location assumption.

The measurement report component 825 may generate a reference signal measurement for the aperiodic reference signal and transmit a measurement report that indicates the reference signal measurement.

The QCL source component 830 may derive a channel metric that includes one or more of delay spread, doppler spread, average delay, doppler shift, or any combination thereof, based on the reference signal measurement.

In some examples, the QCL source component 830 may decode a shared data channel that uses the aperiodic reference signal as a quasi co-location source.

Figure 9:
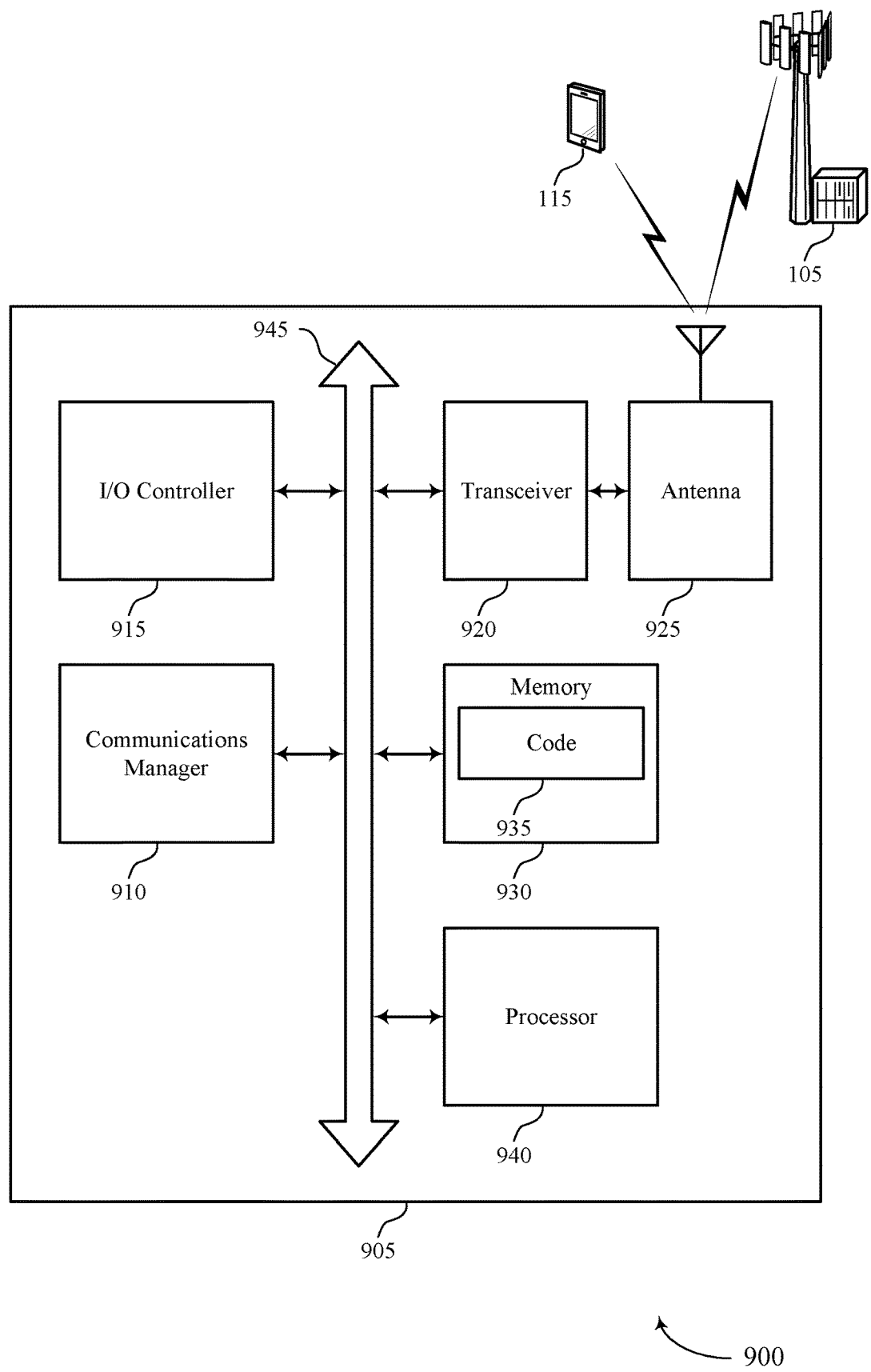
FIG. 9 shows a diagram of a system including a device that supports default quasi co-location assumption for cross carrier reference signal triggering in accordance with aspects of the present disclosure.

FIG. 9 shows a diagram of a system 900 including a device 905 that supports default quasi co-location assumption for cross carrier reference signal triggering in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may receive, via a first component carrier, control information that triggers transmission of an aperiodic reference signal in a second component carrier, identify a quasi co-location assumption for reception of the aperiodic reference signal in the second component carrier based on a control resource set not being configured for the second component carrier, and receive the aperiodic reference signal of the second component carrier based on the quasi co-location assumption.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM and ROM. The memory 930 may store computer-readable, computer-executable code 935 including instructions that, when executed, cause the processor to perform various functions described herein. In some cases, the memory 930 may contain, among other things, a BIOS which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting default quasi co-location assumption for cross carrier reference signal triggering).

The actions performed by the communications manager 910 as described herein may be implemented to realize one or more potential advantages at components of the device 905. For example, by applying a default QCL assumption for aperiodic reference signal measurement on a component carrier, even without a configured control resource set configured for that component carrier, the device 905 may perform accurate measurements of the reference signal on the component carrier. This may improve reception performance for the transceiver 920, as the device 905 may configure its receive antennas according to the default QCL assumption which enhances reception quality and likelihood.

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
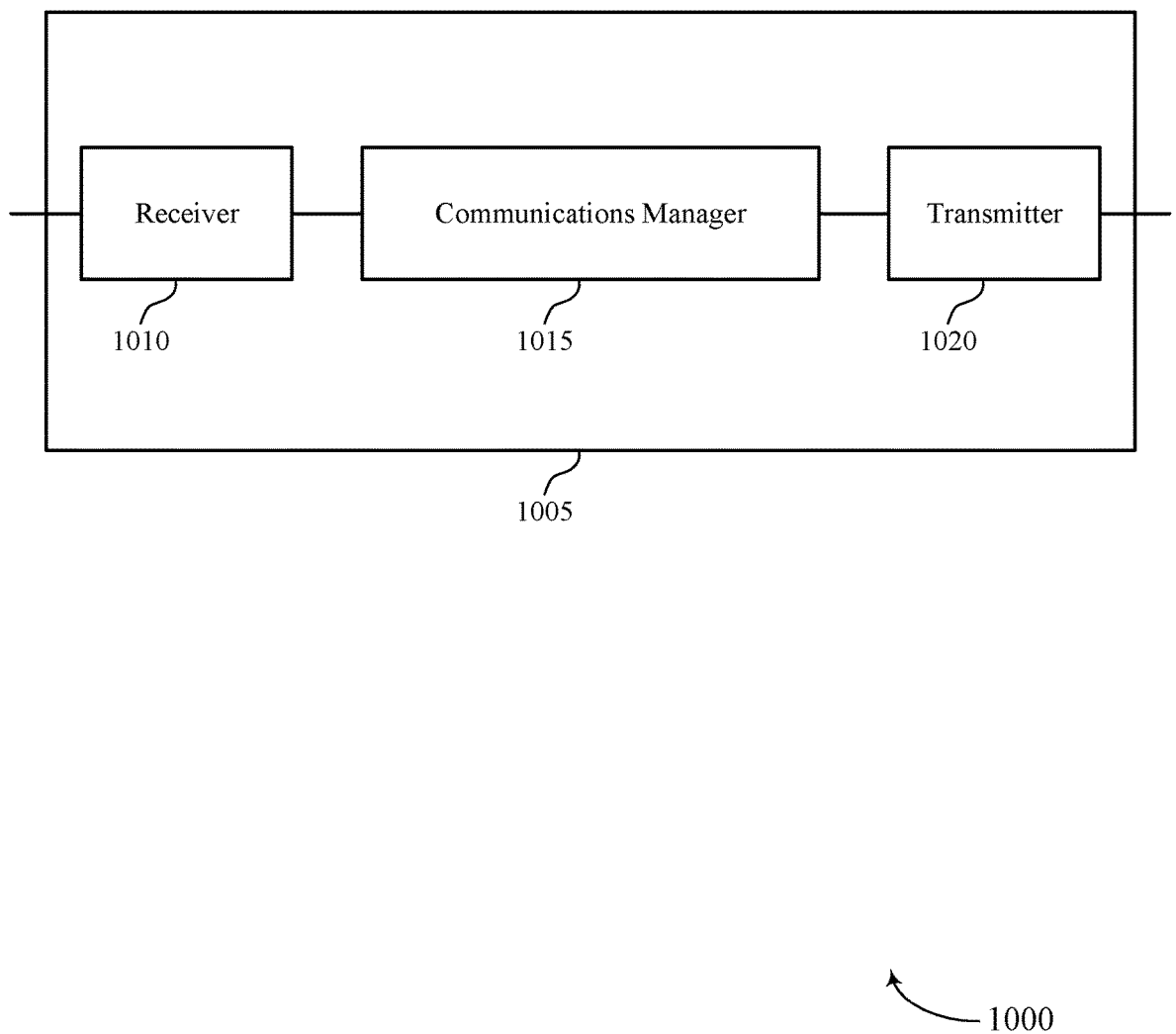
FIGS. 10 and 11 show diagrams of devices that support default quasi co-location assumption for cross carrier reference signal triggering in accordance with aspects of the present disclosure.

FIG. 10 shows a diagram 1000 of a device 1005 that supports default quasi co-location assumption for cross carrier reference signal triggering in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to default quasi co-location assumption for cross carrier reference signal triggering, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may transmit, via a first component carrier, control information that triggers transmission of a aperiodic reference signal in a second component carrier, identify a quasi co-location assumption for transmission of the aperiodic reference signal in the second component carrier based on a control resource set not being configured for the UE for the second component carrier, and transmit an aperiodic reference signal via the second component carrier based on the quasi co-location assumption. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
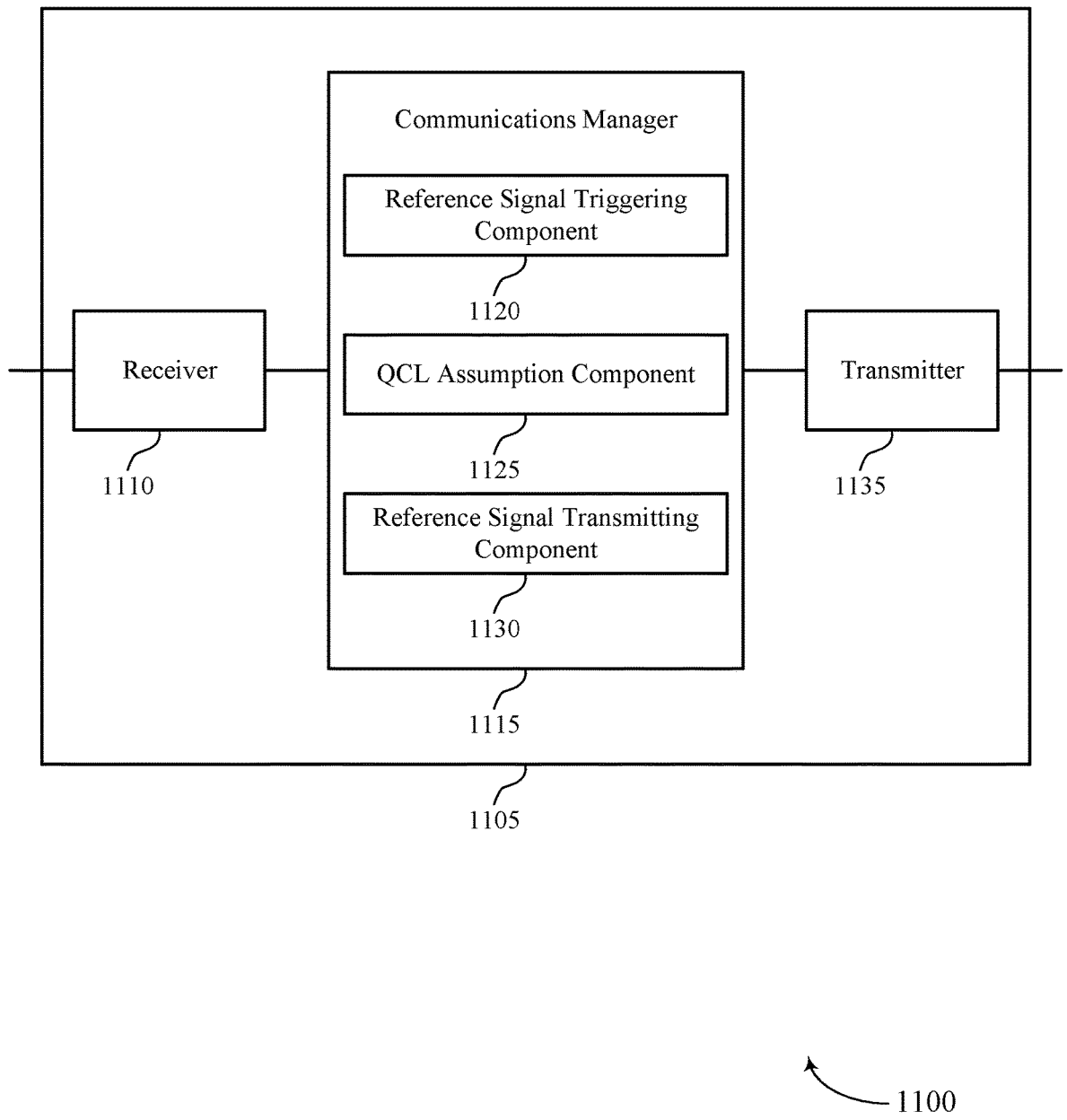

FIG. 11 shows a diagram 1100 of a device 1105 that supports default quasi co-location assumption for cross carrier reference signal triggering in accordance with aspects of the present disclosure. The device 1105 may be an example of aspects of a device 1005, or a base station 105 as described herein. The device 1105 may include a receiver 1110, a communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to default quasi co-location assumption for cross carrier reference signal triggering, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a reference signal triggering component 1120, a QCL assumption component 1125, and a reference signal transmitting component 1130. The communications manager 1115 may be an example of aspects of the communications manager 1310 described herein.

The reference signal triggering component 1120 may transmit, via a first component carrier, control information that triggers transmission of a aperiodic reference signal in a second component carrier.

The QCL assumption component 1125 may identify a quasi co-location assumption for transmission of the aperiodic reference signal in the second component carrier based on a control resource set not being configured for the UE for the second component carrier.

The reference signal transmitting component 1130 may transmit an aperiodic reference signal via the second component carrier based on the quasi co-location assumption.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
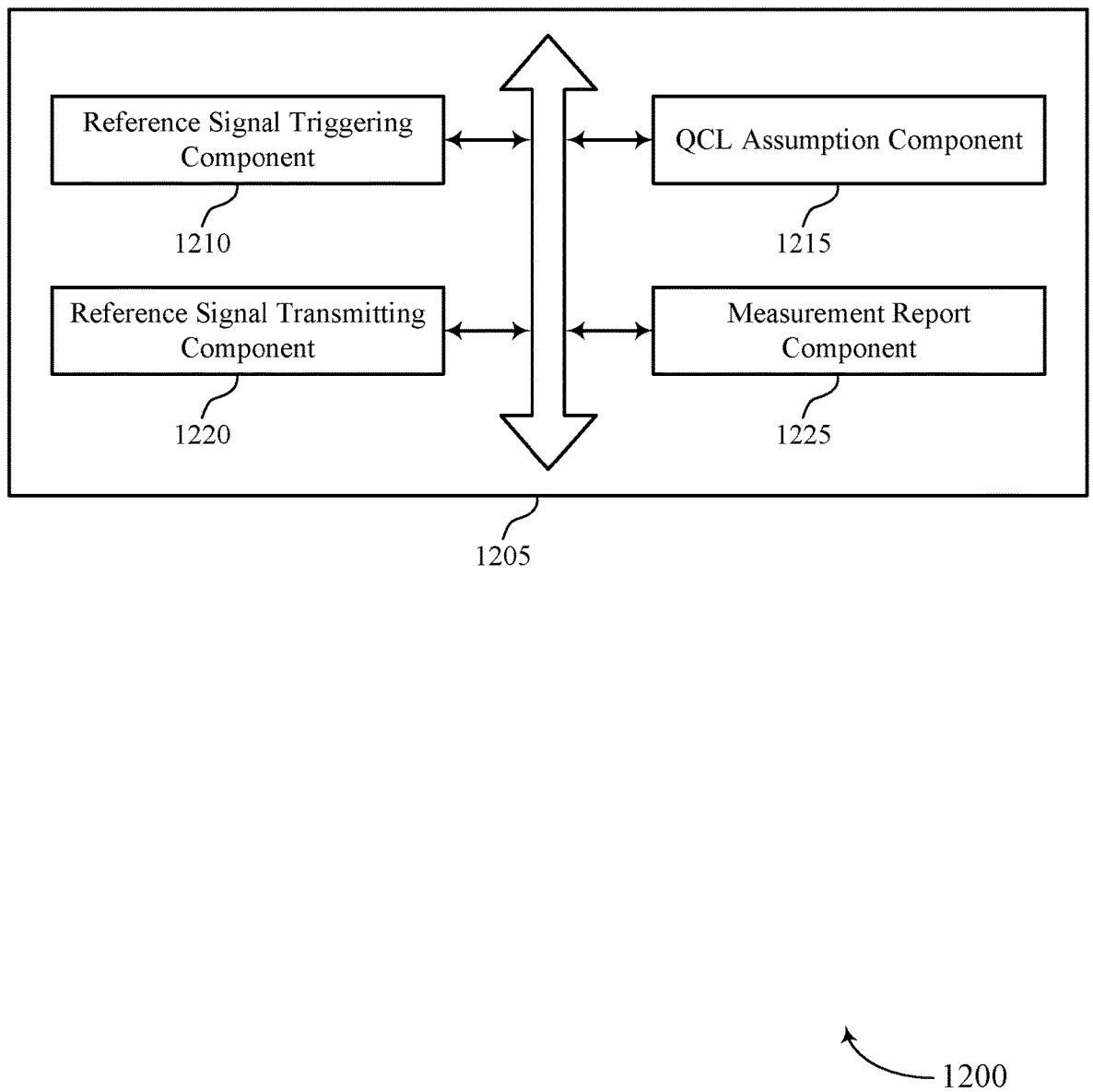
FIG. 12 shows a diagram of a communications manager that supports default quasi co-location assumption for cross carrier reference signal triggering in accordance with aspects of the present disclosure.

FIG. 12 shows a diagram 1200 of a communications manager 1205 that supports default quasi co-location assumption for cross carrier reference signal triggering in accordance with aspects of the present disclosure. The communications manager 1205 may be an example of aspects of a communications manager 1015, a communications manager 1115, or a communications manager 1310 described herein. The communications manager 1205 may include a reference signal triggering component 1210, a QCL assumption component 1215, a reference signal transmitting component 1220, and a measurement report component 1225. Each of these modules may communicate, directly or indirectly, with one another (e.g., via one or more buses).

The reference signal triggering component 1210 may transmit, via a first component carrier, control information that triggers transmission of a aperiodic reference signal in a second component carrier.

In some examples, the reference signal triggering component 1210 may transmit, via the first component carrier having a first numerology, the control information that triggers transmission of the aperiodic reference signal in the second component carrier that has a second numerology that differs from the first numerology.

In some examples, the reference signal triggering component 1210 may transmit, via the first component carrier that is an FR1 component carrier that has a first numerology, the control information that triggers transmission of the aperiodic reference signal in the second component carrier that has a second numerology that differs from the first numerology.

In some examples, the reference signal triggering component 1210 may transmit, via the first component carrier that is an FR2 component carrier, or an FR3 component carrier, or an FR4 component carrier, the control information that triggers transmission of the aperiodic reference signal in the second component carrier that is a FR2 component carrier, or a FR3 component carrier, or a FR4 component carrier.

In some examples, the reference signal triggering component 1210 may transmit, via the first component carrier, the control information that triggers transmission of the aperiodic reference signal in the second component carrier that is a frequency range 2 (FR2) component carrier, or a frequency range 3 (FR3) component carrier, or a frequency range 4 (FR4) component carrier.

The QCL assumption component 1215 may identify a quasi co-location assumption for transmission of the aperiodic reference signal in the second component carrier based on a control resource set not being configured for the UE for the second component carrier.

In some examples, the QCL assumption component 1215 may transmit control signaling that indicates a set of configured transmission configuration indicator states for a shared data channel of the second component carrier, where the identified quasi co-location assumption is the same as a quasi co-location assumption corresponding to a first transmission configuration indicator state of the set of configured transmission configuration indicator states.

In some examples, the QCL assumption component 1215 may transmit a control message that indicates that the first transmission configuration indicator state is an activated transmission configuration indicator state with a lowest identifier of a set of identifiers corresponding to the one or more configured transmission configuration indicator states.

In some examples, the QCL assumption component 1215 may transmit the control message that is a medium access control (MAC) control element (CE).

In some examples, the QCL assumption component 1215 may transmit the control signaling that is radio resource control signaling that indicates the set of configured transmission configuration indicator states.

In some examples, the QCL assumption component 1215 may transmit control signaling that indicates a set of configured transmission configuration indicator states for the second component carrier, where the identified quasi co-location assumption is the same as a quasi co-location assumption corresponding to a first transmission configuration indicator state of the set of configured transmission configuration indicator states.

In some examples, the QCL assumption component 1215 may perform a random access procedure on the second component carrier with the UE after detection of a synchronization signal block in the second component carrier, where the identified quasi co-location assumption is the same as a quasi co-location assumption for the synchronization signal block.

In some cases, the first transmission configuration indicator state that has a lowest identifier in a set of identifiers that respectively correspond to the set of configured transmission configuration indicator states.

In some cases, the first transmission configuration indicator state is a latest activated transmission configuration indicator state of the set of configured transmission configuration indicator states.

The reference signal transmitting component 1220 may transmit an aperiodic reference signal via the second component carrier based on the quasi co-location assumption.

In some examples, the reference signal transmitting component 1220 may transmit, via the first component carrier, the control information that is downlink control information that triggers transmission of the aperiodic reference signal in the second component carrier.

The measurement report component 1225 may receive a measurement report that indicates the reference signal measurement.

Figure 13:
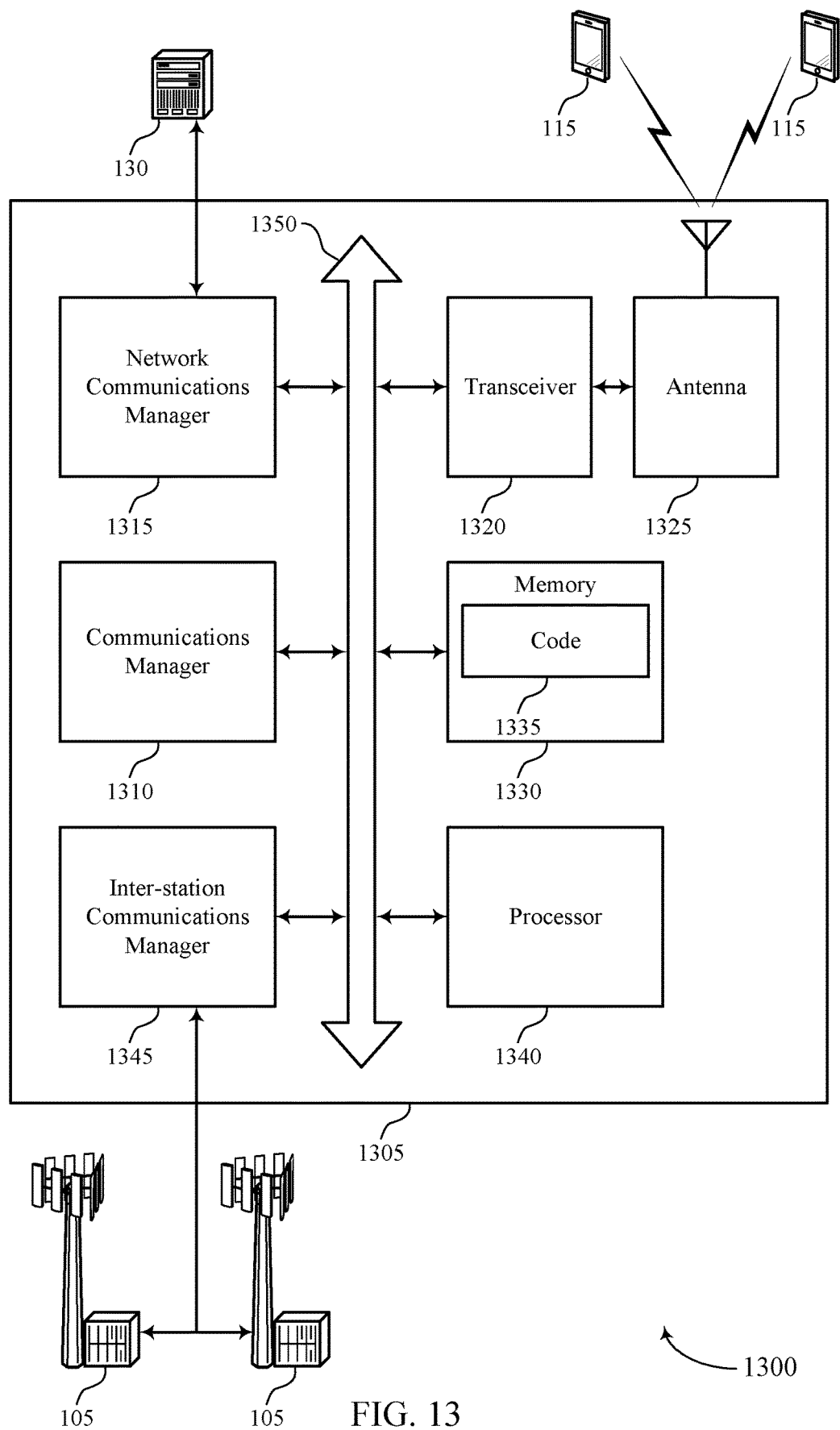
FIG. 13 shows a diagram of a system including a device that supports default quasi co-location assumption for cross carrier reference signal triggering in accordance with aspects of the present disclosure.

FIG. 13 shows a diagram of a system 1300 including a device 1305 that supports default quasi co-location assumption for cross carrier reference signal triggering in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may transmit, via a first component carrier, control information that triggers transmission of a aperiodic reference signal in a second component carrier, identify a quasi co-location assumption for transmission of the aperiodic reference signal in the second component carrier based on a control resource set not being configured for the UE for the second component carrier, and transmit an aperiodic reference signal via the second component carrier based on the quasi co-location assumption.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting default quasi co-location assumption for cross carrier reference signal triggering).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
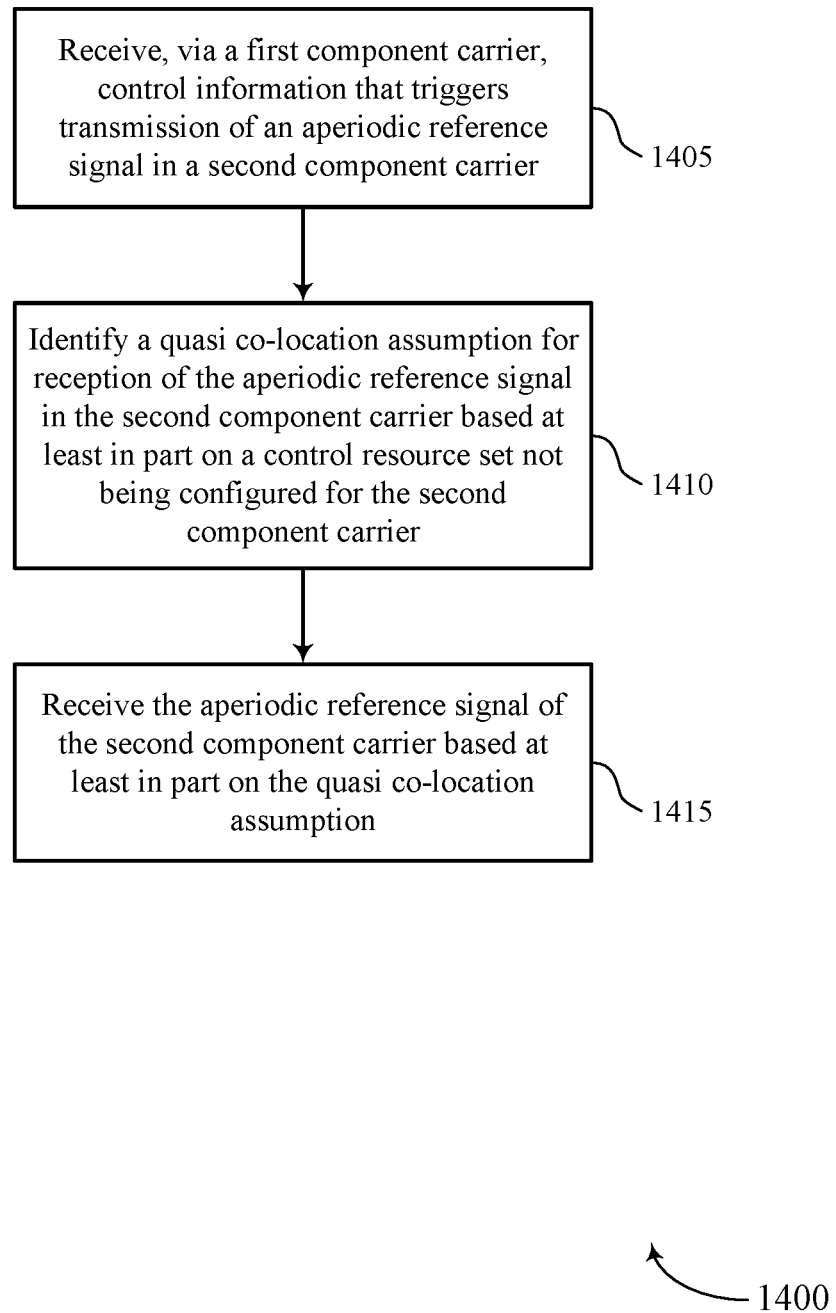
FIGS. 14 through 19 show flowcharts illustrating methods that support default quasi co-location assumption for cross carrier reference signal triggering in accordance with aspects of the present disclosure.

FIG. 14 shows a flowchart illustrating a method 1400 that supports default quasi co-location assumption for cross carrier reference signal triggering in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may receive, via a first component carrier, control information that triggers transmission of an aperiodic reference signal in a second component carrier. The operations of 1405 may be performed according to the methods described herein. In some examples, aspects of the operations of 1405 may be performed by a triggering component as described with reference to FIGS. 6 through 9.

At 1410, the UE may identify a quasi co-location assumption for reception of the aperiodic reference signal in the second component carrier based at least in part on a control resource set not being configured for the second component carrier. The operations of 1410 may be performed according to the methods described herein. In some examples, aspects of the operations of 1410 may be performed by a QCL assumption component as described with reference to FIGS. 6 through 9.

At 1415, the UE may receive the aperiodic reference signal of the second component carrier based at least in part on the quasi co-location assumption. The operations of 1415 may be performed according to the methods described herein. In some examples, aspects of the operations of 1415 may be performed by a reference signal measurement component as described with reference to FIGS. 6 through 9.

Figure 15:
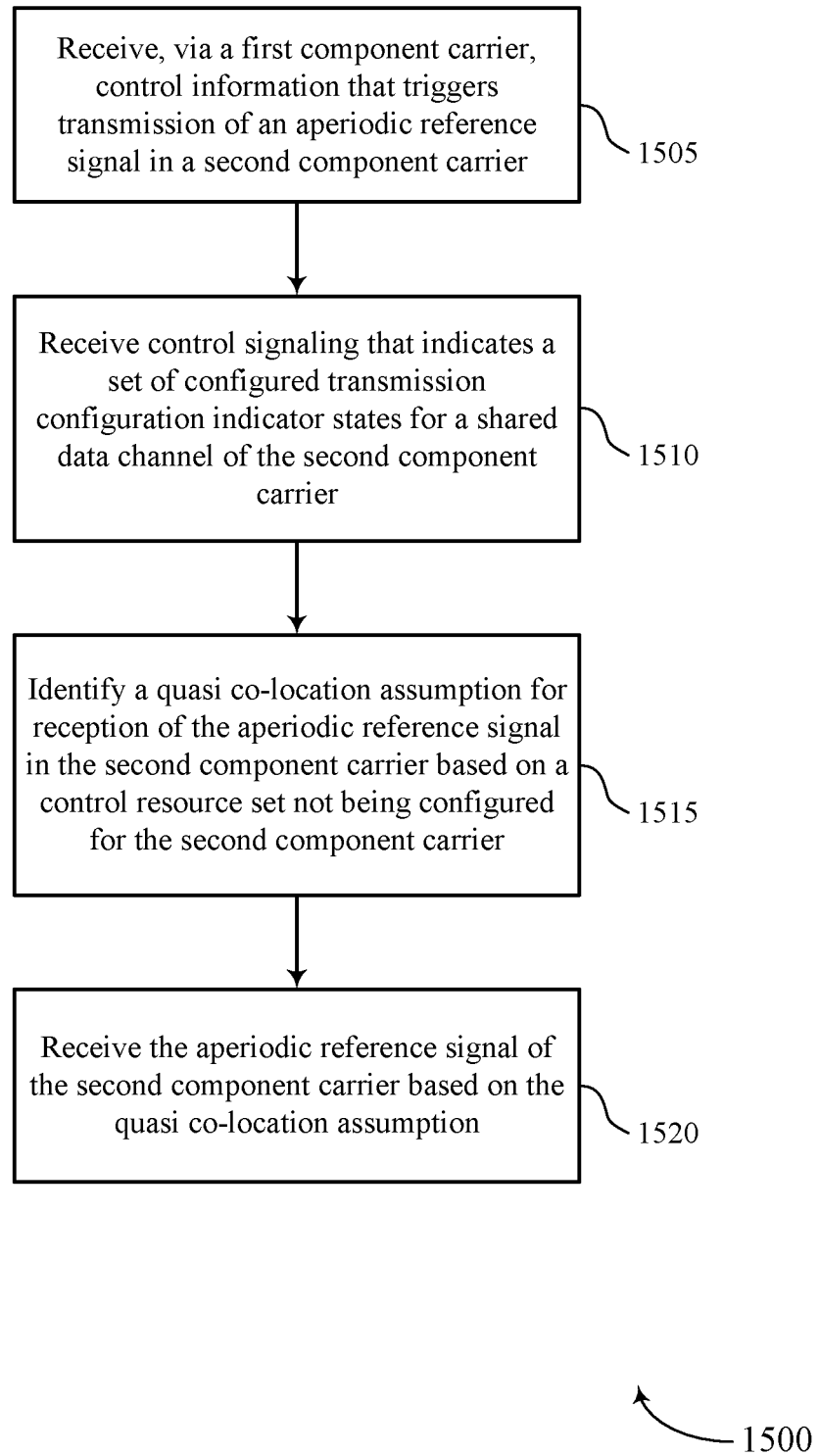

FIG. 15 shows a flowchart illustrating a method 1500 that supports default quasi co-location assumption for cross carrier reference signal triggering in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may receive, via a first component carrier, control information that triggers transmission of an aperiodic reference signal in a second component carrier. The operations of 1505 may be performed according to the methods described herein. In some examples, aspects of the operations of 1505 may be performed by a triggering component as described with reference to FIGS. 6 through 9.

At 1510, the UE may receive control signaling that indicates a set of configured transmission configuration indicator states for a shared data channel of the second component carrier, where the identified quasi co-location assumption is the same as a quasi co-location assumption corresponding to a first transmission configuration indicator state of the set of configured transmission configuration indicator states. The operations of 1510 may be performed according to the methods described herein. In some examples, aspects of the operations of 1510 may be performed by a QCL assumption component as described with reference to FIGS. 6 through 9.

At 1515, the UE may identify a quasi co-location assumption for reception of the aperiodic reference signal in the second component carrier based on a control resource set not being configured for the second component carrier. The operations of 1515 may be performed according to the methods described herein. In some examples, aspects of the operations of 1515 may be performed by a QCL assumption component as described with reference to FIGS. 6 through 9.

At 1520, the UE may receive the aperiodic reference signal of the second component carrier based on the quasi co-location assumption. The operations of 1520 may be performed according to the methods described herein. In some examples, aspects of the operations of 1520 may be performed by a reference signal measurement component as described with reference to FIGS. 6 through 9.

Figure 16:
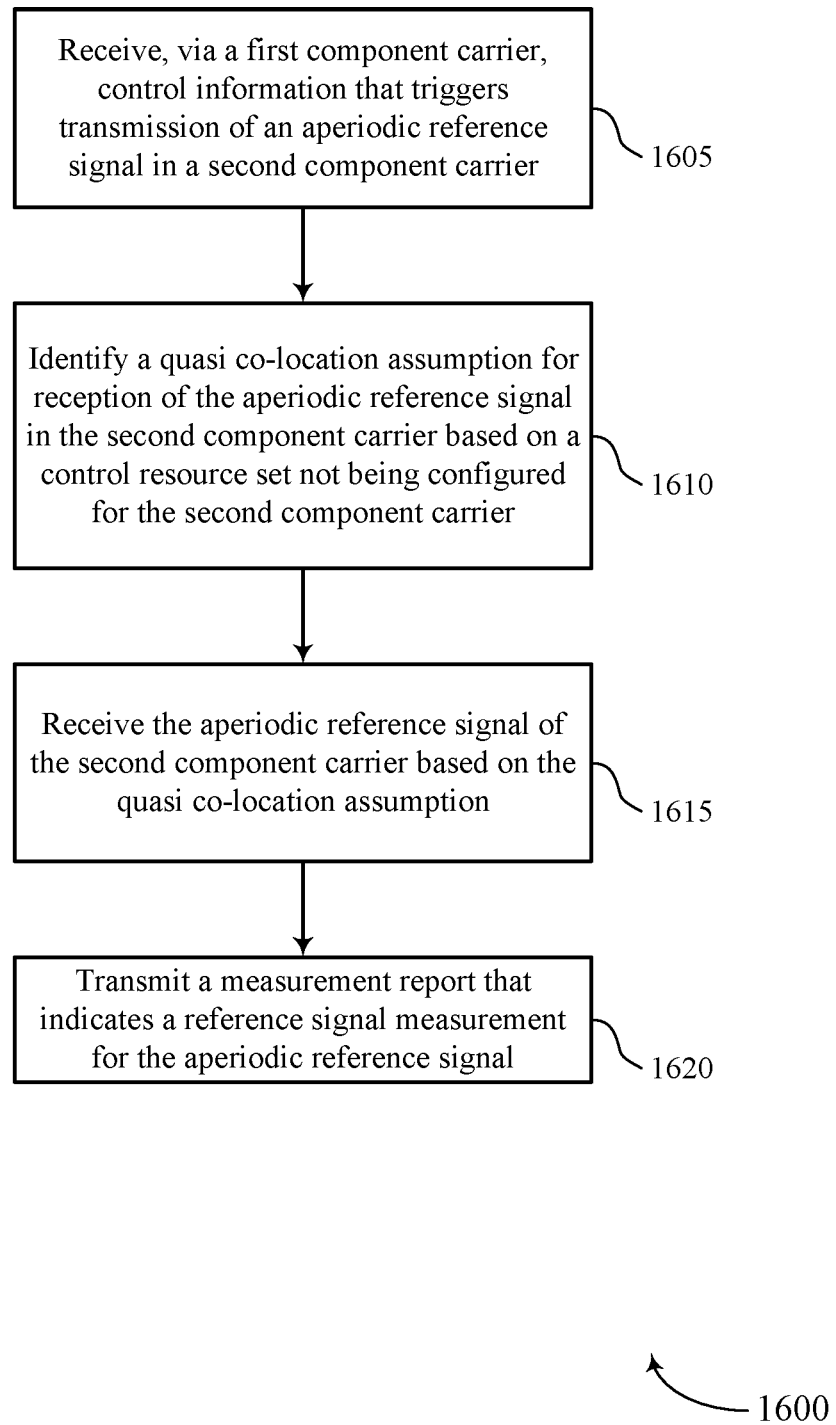

FIG. 16 shows a flowchart illustrating a method 1600 that supports default quasi co-location assumption for cross carrier reference signal triggering in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1605, the UE may receive, via a first component carrier, control information that triggers transmission of an aperiodic reference signal in a second component carrier. The operations of 1605 may be performed according to the methods described herein. In some examples, aspects of the operations of 1605 may be performed by a triggering component as described with reference to FIGS. 6 through 9.

At 1610, the UE may identify a quasi co-location assumption for reception of the aperiodic reference signal in the second component carrier based on a control resource set not being configured for the second component carrier. The operations of 1610 may be performed according to the methods described herein. In some examples, aspects of the operations of 1610 may be performed by a QCL assumption component as described with reference to FIGS. 6 through 9.

At 1615, the UE may receive the aperiodic reference signal of the second component carrier based on the quasi co-location assumption. The operations of 1615 may be performed according to the methods described herein. In some examples, aspects of the operations of 1615 may be performed by a reference signal measurement component as described with reference to FIGS. 6 through 9.

At 1620, the UE may transmit a measurement report that indicates a reference signal measurement for the aperiodic reference signal. The operations of 1620 may be performed according to the methods described herein. In some examples, aspects of the operations of 1620 may be performed by a measurement report component as described with reference to FIGS. 6 through 9.

Figure 17:
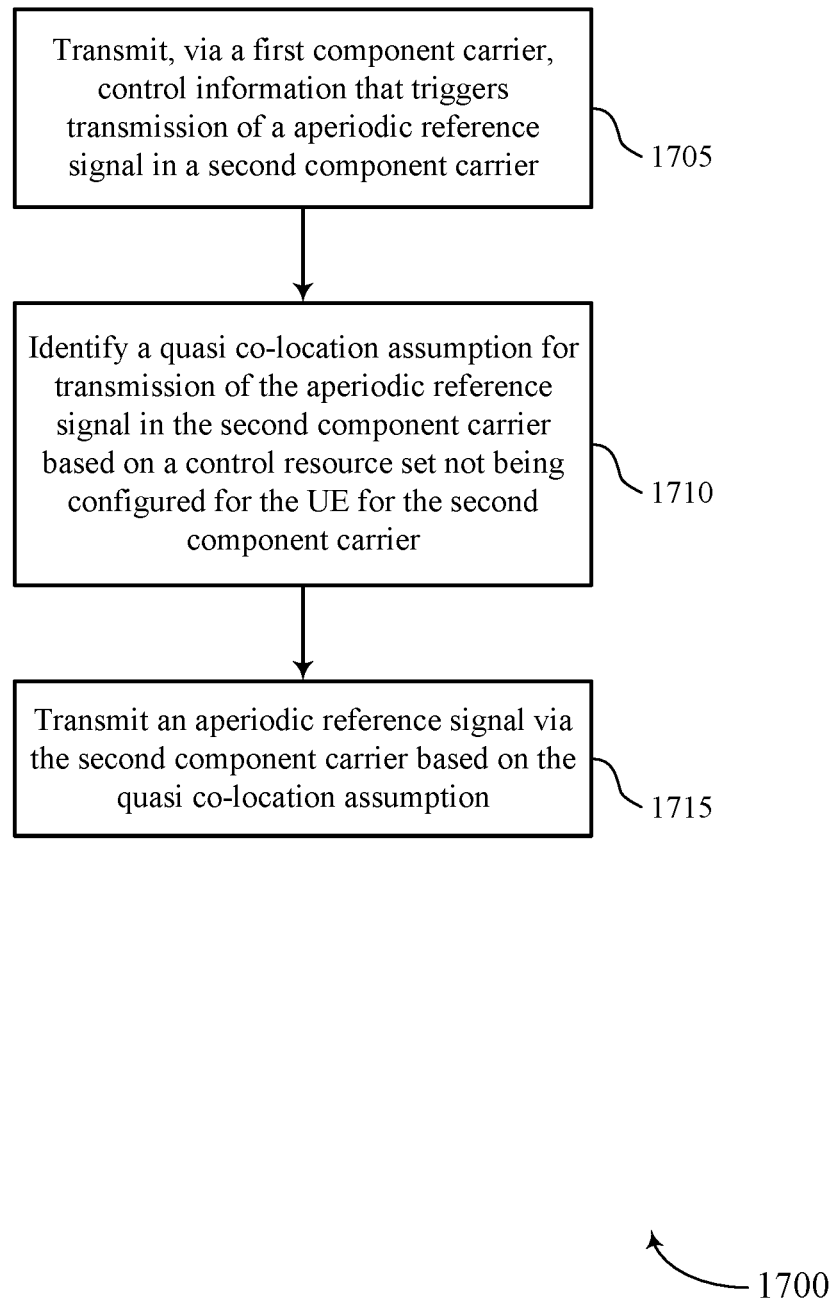

FIG. 17 shows a flowchart illustrating a method 1700 that supports default quasi co-location assumption for cross carrier reference signal triggering in accordance with aspects of the present disclosure. The operations of method 1700 may be implemented by a base station 105 or its components as described herein. For example, the operations of method 1700 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1705, the base station may transmit, via a first component carrier, control information that triggers transmission of a aperiodic reference signal in a second component carrier. The operations of 1705 may be performed according to the methods described herein. In some examples, aspects of the operations of 1705 may be performed by a reference signal triggering component as described with reference to FIGS. 10 through 13.

At 1710, the base station may identify a quasi co-location assumption for transmission of the aperiodic reference signal in the second component carrier based on a control resource set not being configured for the UE for the second component carrier. The operations of 1710 may be performed according to the methods described herein. In some examples, aspects of the operations of 1710 may be performed by a QCL assumption component as described with reference to FIGS. 10 through 13.

At 1715, the base station may transmit an aperiodic reference signal via the second component carrier based on the quasi co-location assumption. The operations of 1715 may be performed according to the methods described herein. In some examples, aspects of the operations of 1715 may be performed by a reference signal transmitting component as described with reference to FIGS. 10 through 13.

Figure 18:
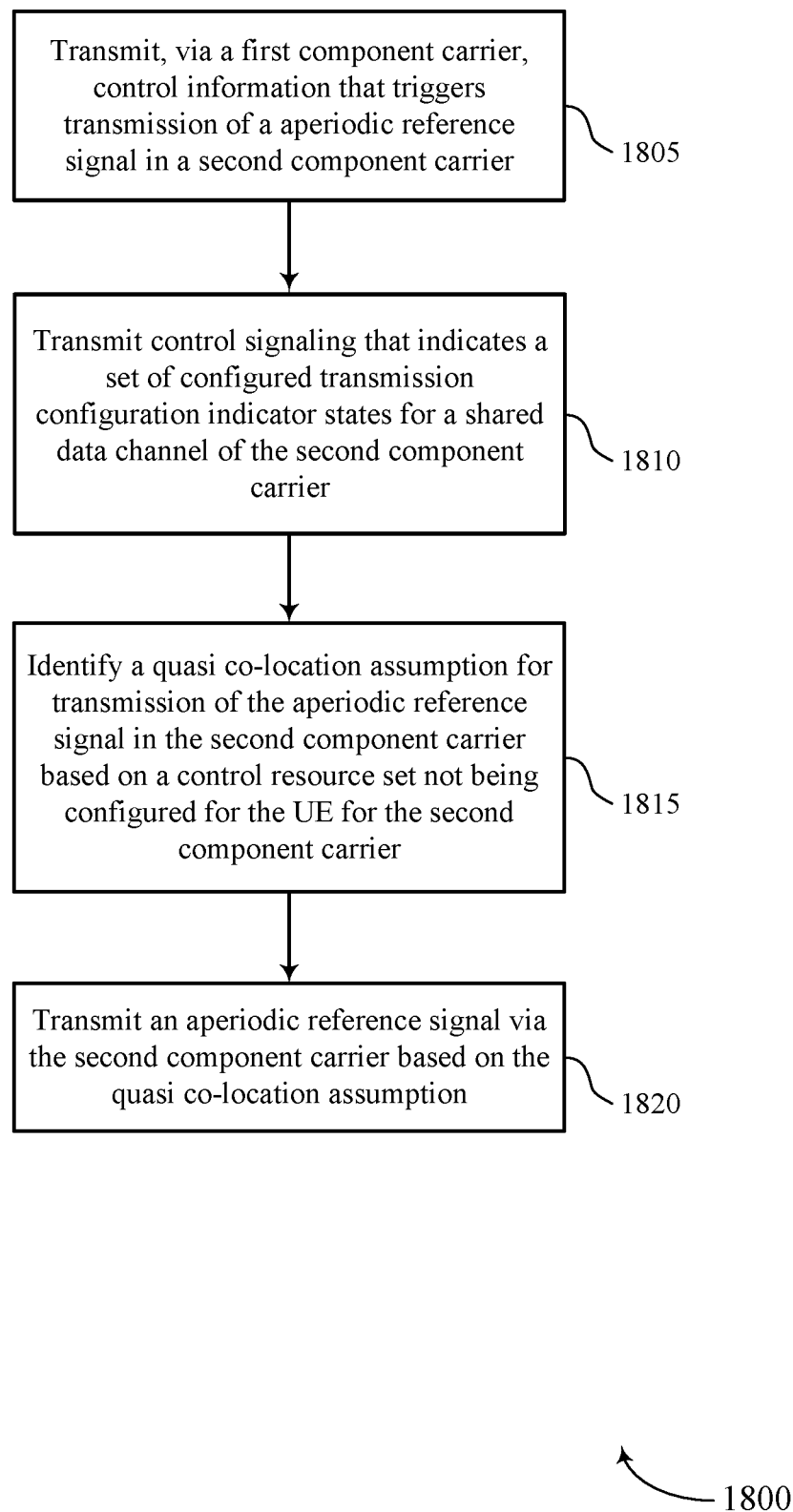

FIG. 18 shows a flowchart illustrating a method 1800 that supports default quasi co-location assumption for cross carrier reference signal triggering in accordance with aspects of the present disclosure. The operations of method 1800 may be implemented by a base station 105 or its components as described herein. For example, the operations of method 1800 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1805, the base station may transmit, via a first component carrier, control information that triggers transmission of a aperiodic reference signal in a second component carrier. The operations of 1805 may be performed according to the methods described herein. In some examples, aspects of the operations of 1805 may be performed by a reference signal triggering component as described with reference to FIGS. 10 through 13.

At 1810, the base station may transmit control signaling that indicates a set of configured transmission configuration indicator states for a shared data channel of the second component carrier, where the identified quasi co-location assumption is the same as a quasi co-location assumption corresponding to a first transmission configuration indicator state of the set of configured transmission configuration indicator states. The operations of 1810 may be performed according to the methods described herein. In some examples, aspects of the operations of 1810 may be performed by a QCL assumption component as described with reference to FIGS. 10 through 13.

At 1815, the base station may identify a quasi co-location assumption for transmission of the aperiodic reference signal in the second component carrier based on a control resource set not being configured for the UE for the second component carrier. The operations of 1815 may be performed according to the methods described herein. In some examples, aspects of the operations of 1815 may be performed by a QCL assumption component as described with reference to FIGS. 10 through 13.

At 1820, the base station may transmit an aperiodic reference signal via the second component carrier based on the quasi co-location assumption. The operations of 1820 may be performed according to the methods described herein. In some examples, aspects of the operations of 1820 may be performed by a reference signal transmitting component as described with reference to FIGS. 10 through 13.

Figure 19:
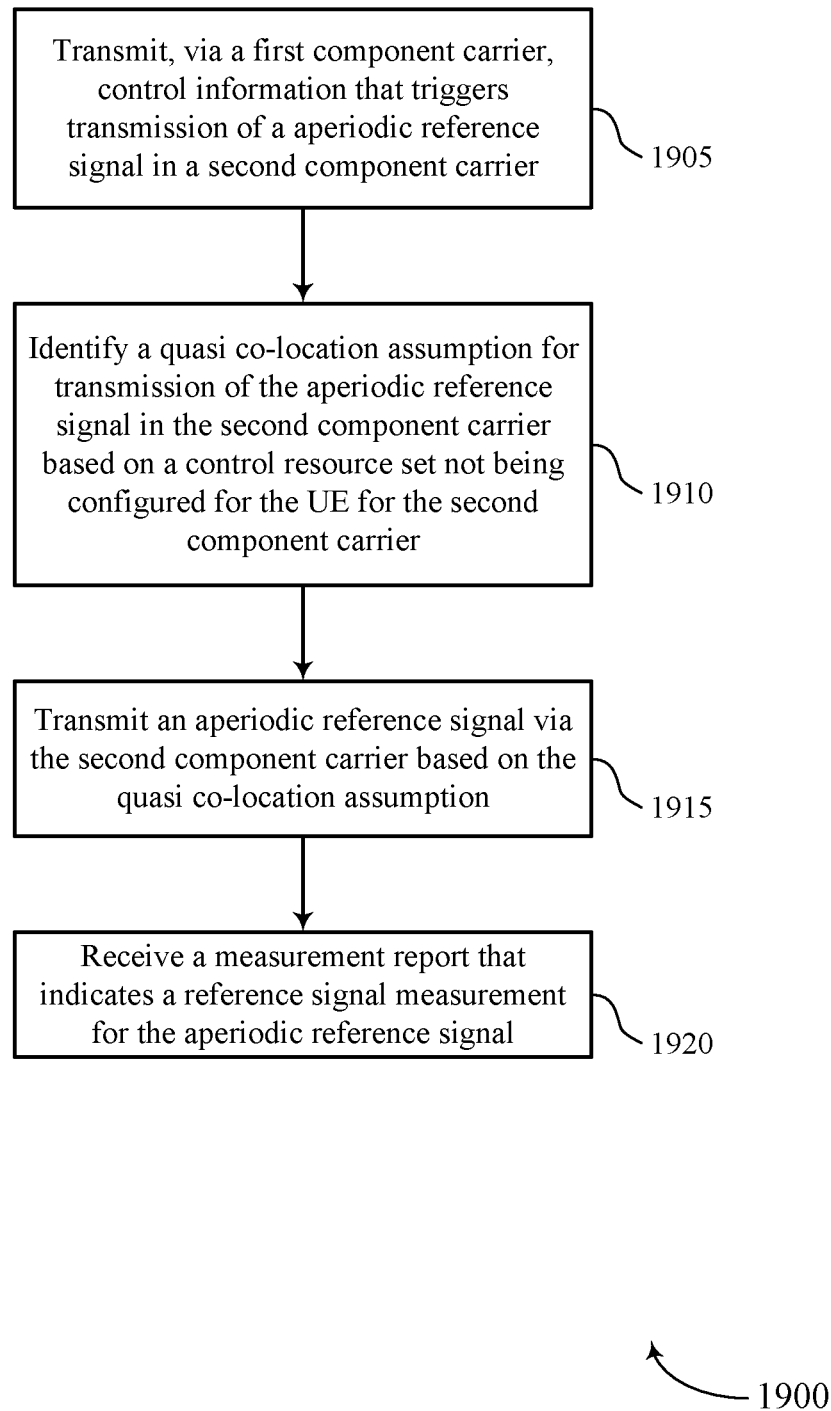

FIG. 19 shows a flowchart illustrating a method 1900 that supports default quasi co-location assumption for cross carrier reference signal triggering in accordance with aspects of the present disclosure. The operations of method 1900 may be implemented by a base station 105 or its components as described herein. For example, the operations of method 1900 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1905, the base station may transmit, via a first component carrier, control information that triggers transmission of a aperiodic reference signal in a second component carrier. The operations of 1905 may be performed according to the methods described herein. In some examples, aspects of the operations of 1905 may be performed by a reference signal triggering component as described with reference to FIGS. 10 through 13.

At 1910, the base station may identify a quasi co-location assumption for transmission of the aperiodic reference signal in the second component carrier based on a control resource set not being configured for the UE for the second component carrier. The operations of 1910 may be performed according to the methods described herein. In some examples, aspects of the operations of 1910 may be performed by a QCL assumption component as described with reference to FIGS. 10 through 13.

At 1915, the base station may transmit an aperiodic reference signal via the second component carrier based on the quasi co-location assumption. The operations of 1915 may be performed according to the methods described herein. In some examples, aspects of the operations of 1915 may be performed by a reference signal transmitting component as described with reference to FIGS. 10 through 13.

At 1920, the base station may receive a measurement report that indicates a reference signal measurement for the aperiodic reference signal. The operations of 1920 may be performed according to the methods described herein. In some examples, aspects of the operations of 1920 may be performed by a measurement report component as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in diagram form or block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications by a user equipment (UE), comprising:
   receiving, via a first component carrier, control information that triggers transmission of an aperiodic reference signal in a second component carrier;
   receiving control signaling that indicates a plurality of configured transmission configuration indicator states for the second component carrier;
   identifying a quasi co-location assumption for reception of the aperiodic reference signal in the second component carrier based at least in part on a control resource set not being configured for the second component carrier, the quasi co-location assumption corresponding to a first transmission configuration indicator state that has a lowest identifier in a set of identifiers that correspond to the plurality of configured transmission configuration indicator states; and
   receiving the aperiodic reference signal of the second component carrier based at least in part on the quasi co-location assumption.

2. The method of claim 1,:
   wherein the control signaling indicates one or more configured transmission configuration indicator states for a shared data channel of the second component carrier.

3. The method of claim 2, further comprising:
   receiving a control message that indicates that the first transmission configuration indicator state is an activated transmission configuration indicator state with the lowest identifier.

4. The method of claim 3, wherein
   the control message is a medium access control (MAC) control element (CE).

5. The method of claim 2, wherein
   the control signaling is radio resource control signaling that indicates the one or more configured transmission configuration indicator states.

6. The method of claim 1, wherein the first transmission configuration indicator state is a latest activated transmission configuration indicator state of the plurality of configured transmission configuration indicator states.

7. The method of claim 1, wherein receiving the control information comprises:
   receiving, via the first component carrier having a first numerology, the control information that triggers transmission of the aperiodic reference signal in the second component carrier that has a second numerology that differs from the first numerology.

8. The method of claim 1, wherein receiving the control information comprises:
   receiving, via the first component carrier that is a frequency range 1 (FR1) component carrier that has a first numerology, the control information that triggers transmission of the aperiodic reference signal in the second component carrier that has a second numerology that differs from the first numerology.

9. The method of claim 1, wherein receiving the control information comprises:
   receiving, via the first component carrier that is a frequency range 2 (FR2) component carrier, or a frequency range 3 (FR3) component carrier, or a frequency range 4 (FR4) component carrier, the control information that triggers transmission of the aperiodic reference signal in the second component carrier that is a frequency range 2 (FR2) component carrier, or a FR3 component carrier, or a FR4 component carrier.

10. The method of claim 1, wherein receiving the control information comprises:
receiving, via the first component carrier, the control information that triggers transmission of the aperiodic reference signal in the second component carrier that is a frequency range 2 (FR2) component carrier, or a frequency range 3 (FR3) component carrier, or a frequency range 4 (FR4) component carrier.

11. The method of claim 1, wherein receiving the control information comprises:
receiving, via the first component carrier, the control information that is downlink control information that triggers transmission of the aperiodic reference signal in the second component carrier.

12. The method of claim 1, further comprising:
generating a reference signal measurement for the aperiodic reference signal; and
transmitting a measurement report that indicates the reference signal measurement.

13. The method of claim 12, further comprising:
deriving a channel metric that comprises one or more of delay spread, doppler spread, average delay, doppler shift, or any combination thereof, based at least in part on the reference signal measurement; and
decoding a shared data channel that uses the aperiodic reference signal as a quasi co-location source.

14. A method for wireless communications by a base station, comprising:
transmitting, via a first component carrier, control information that triggers transmission of a aperiodic reference signal in a second component carrier;
transmitting control signaling that indicates a plurality of configured transmission configuration indicator states for the second component carrier;
identifying a quasi co-location assumption for transmission of the aperiodic reference signal in the second component carrier based at least in part on a control resource set not being configured for a user equipment (UE) for the second component carrier, the quasi co-location assumption corresponding to a first transmission configuration indicator state that has a lowest identifier in a set of identifiers that correspond to the plurality of configured transmission configuration indicator states; and
transmitting an aperiodic reference signal via the second component carrier based at least in part on the quasi co-location assumption.

15. The method of claim 14,
wherein the control signaling indicates one or more configured transmission configuration indicator states for a shared data channel of the second component carrier.

16. The method of claim 15, further comprising:
transmitting a control message that indicates that the first transmission configuration indicator state is an activated transmission configuration indicator state with the lowest identifier of a set of identifiers.

17. The method of claim 16, wherein
the control message is a medium access control (MAC) control element (CE).

18. The method of claim 15, wherein
the control signaling is radio resource control signaling that indicates the one or more configured transmission configuration indicator states.

19. The method of claim 14, wherein transmitting the control information comprises:
transmitting, via the first component carrier having a first numerology, the control information that triggers transmission of the aperiodic reference signal in the second component carrier that has a second numerology that differs from the first numerology.

20. The method of claim 14, wherein transmitting the control information comprises:
transmitting, via the first component carrier that is a frequency range 1 (FR1) component carrier that has a first numerology, the control information that triggers transmission of the aperiodic reference signal in the second component carrier that has a second numerology that differs from the first numerology.

21. The method of claim 14, wherein transmitting the control information comprises:
transmitting, via the first component carrier that is a frequency range 2 (FR2) component carrier, or a frequency range 3 (FR3) component carrier, or a frequency range 4 (FR4) component carrier, the control information that triggers transmission of the aperiodic reference signal in the second component carrier that is a FR2 component carrier, or a FR3 component carrier, or a FR4 component carrier.

22. The method of claim 14, wherein transmitting the control information comprises:
transmitting, via the first component carrier, the control information that triggers transmission of the aperiodic reference signal in the second component carrier that is a frequency range 2 (FR2) component carrier, or a frequency range 3 (FR3) component carrier, or a frequency range 4 (FR4) component carrier.

23. The method of claim 14, wherein transmitting the control information comprises:
transmitting, via the first component carrier, the control information that is downlink control information that triggers transmission of the aperiodic reference signal in the second component carrier.

24. An apparatus for wireless communications by a user equipment (UE), comprising:
a processor,
memory coupled with the processor; and
instructions stored in the memory and executable by the processor to cause the apparatus to:
receive, via a first component carrier, control information that triggers transmission of an aperiodic reference signal in a second component carrier;
receive control signaling that indicates a plurality of configured transmission configuration indicator states for the second component carrier;
identify a quasi co-location assumption for reception of the aperiodic reference signal in the second component carrier based at least in part on a control resource set not being configured for the second component carrier, the quasi co-location assumption corresponding to a first transmission configuration indicator state that has a lowest identifier in a set of identifiers that correspond to the plurality of configured transmission configuration indicator states; and
receive the aperiodic reference signal of the second component carrier based at least in part on the quasi co-location assumption.

25. The apparatus of claim 24, wherein the instructions to receive the control information are further executable by the processor to cause the apparatus to:

receive, via the first component carrier having a first numerology, the control information that triggers transmission of the aperiodic reference signal in the second component carrier that has a second numerology that differs from the first numerology.

26. The apparatus of claim 24, wherein the instructions to receive the control information are further executable by the processor to cause the apparatus to:

receive, via the first component carrier that is a frequency range 1 (FR1) component carrier that has a first numerology, the control information that triggers transmission of the aperiodic reference signal in the second component carrier that has a second numerology that differs from the first numerology.

27. The apparatus of claim 24, wherein the instructions to receive the control information are further executable by the processor to cause the apparatus to:

receive, via the first component carrier that is a frequency range 2 (FR2) component carrier, or a frequency range 3 (FR3) component carrier, or a frequency range 4 (FR4) component carrier, the control information that triggers transmission of the aperiodic reference signal in the second component carrier that is a FR2 component carrier, or a FR3 component carrier, or a FR4 component carrier.

28. The apparatus of claim 24, wherein the instructions to receive the control information are further executable by the processor to cause the apparatus to:

receive, via the first component carrier, the control information that triggers transmission of the aperiodic reference signal in the second component carrier that is a frequency range 2 (FR2) component carrier, or a frequency range 3 (FR3) component carrier, or a frequency range 4 (FR4) component carrier.

29. The apparatus of claim 24, wherein the instructions to receive the control information are further executable by the processor to cause the apparatus to:

receive, via the first component carrier, the control information that is downlink control information that triggers transmission of the aperiodic reference signal in the second component carrier.

30. An apparatus for wireless communications by a base station, comprising:

a processor, memory coupled with the processor; and instructions stored in the memory and executable by the processor to cause the apparatus to:

transmit, via a first component carrier, control information that triggers transmission of a aperiodic reference signal in a second component carrier;

transmit control signaling that indicates a plurality of configured transmission configuration indicator states for the second component carrier;

identify a quasi co-location assumption for transmission of the aperiodic reference signal in the second component carrier based at least in part on a control resource set not being configured for a user equipment (UE) for the second component carrier, the quasi co-location assumption corresponding to a first transmission configuration indicator state that has a lowest identifier in a set of identifiers that correspond to the plurality of configured transmission configuration indicator states; and transmit an aperiodic reference signal via the second component carrier based at least in part on the quasi co-location assumption.

* * * * *